United States Patent [19]
Denison

[11] Patent Number: 4,944,578
[45] Date of Patent: Jul. 31, 1990

[54] COLOR GRAPHIC IMAGER UTILIZING A LIQUID CRYSTAL DISPLAY

[75] Inventor: William W. Denison, Edina, Minn.

[73] Assignee: Telex Communications, Minneapolis, Minn.

[21] Appl. No.: 222,164

[22] Filed: Jul. 21, 1988

[51] Int. Cl.$^5$ .......................... G02F 1/13; G03B 21/00
[52] U.S. Cl. ................................ 350/347 E; 350/333; 350/337; 350/341; 353/122; 353/DIG. 5; 340/784
[58] Field of Search ............... 350/347 E, 331 R, 333, 350/339 F, 341, 334, 337, 332; 353/122, DIG. 3, DIG. 5; 340/765, 784

[56] References Cited

U.S. PATENT DOCUMENTS

| | | |
|---|---|---|
| 3,844,650 | 10/1974 | Nicholson et al. .................. 353/122 |
| 3,975,726 | 8/1976 | Kawakami ....................... 350/347 E |
| 4,154,007 | 5/1979 | Judd ........................................ 35/39 |
| 4,194,833 | 3/1980 | Lester et al. ........................... 355/14 |
| 4,222,641 | 9/1980 | Stolov ................................... 353/84 |
| 4,294,524 | 10/1981 | Stolov ................................... 353/84 |
| 4,349,817 | 9/1982 | Hoffman et al. ..................... 340/784 |
| 4,365,869 | 12/1982 | Hareng et al. ....................... 350/345 |
| 4,368,963 | 1/1983 | Stolov ................................... 353/31 |
| 4,372,639 | 2/1983 | Johnson ............................... 350/3.7 |
| 4,386,836 | 6/1983 | Aoki et al. .............................. 355/3 |
| 4,403,216 | 9/1983 | Yokoi .................................. 340/705 |
| 4,409,583 | 10/1983 | Dahan et al. ......................... 340/22 |
| 4,449,123 | 5/1984 | Muranaga ........................... 340/716 |
| 4,514,042 | 4/1985 | Nukii et al. ......................... 350/331 |
| 4,541,690 | 9/1985 | Clerc ................................... 350/333 |
| 4,582,396 | 4/1986 | Bos et al. ......................... 350/347 E |
| 4,596,445 | 6/1986 | Fergason ............................. 350/339 |
| 4,617,563 | 10/1986 | Fujiwara et al. .................... 340/784 |
| 4,634,229 | 1/1987 | Amstutz et al. ..................... 350/341 |
| 4,662,720 | 5/1987 | Fergason ............................. 350/339 |
| 4,664,482 | 5/1987 | Kando et al. ................. 350/347 E X |
| 4,716,403 | 12/1987 | Morozumi ........................... 340/702 |
| 4,742,346 | 5/1988 | Gillette et al. ....................... 340/793 |
| 4,763,993 | 8/1988 | Vogeley et al. ..................... 350/331 |
| 4,812,034 | 3/1989 | Mochizuki et al. ................. 353/122 |
| 4,832,461 | 5/1989 | Yamagishi et al. ............. 350/347 E |
| 4,844,569 | 7/1989 | Wado et al. ..................... 350/347 E |
| 4,846,694 | 7/1989 | Ezhardt ............................... 353/122 |
| 4,880,303 | 11/1989 | Grunwald .................... 353/DIG. 3 |

FOREIGN PATENT DOCUMENTS 3413995 4/1984 Fed. Rep. of Germany .
3506968 2/1985 Fed. Rep. of Germany .
2559923 2/1984 France .

OTHER PUBLICATIONS

Connolly, W. C., "Apparatus for Teaching Physics", Physics Teacher, Sep. 1985.
IBM Technical Disclosure Bulletin, vol. 23, No. 9, 2/81.
Becchetti, F. D. and Dockrill, A. G., "LCD Devices for Overhead Projectors", AM.J.Phys. 52 (5), May 1984.

(List continued on next page.)

*Primary Examiner*—Stanley D. Miller
*Assistant Examiner*—Tai V. Duong

[57] ABSTRACT

A display including a liquid crystal cell. The cell includes a liquid crystal material, a plurality of electrodes, and first and second polarizers. The first polarizer is located at a viewing side of the cell such that the vibration direction of light polarized thereby is non-parallel to the optic axis of the liquid crystal material as its front boundary layer. The second polarizer is located on a side of the cell remote from the first polarizer wherein the vibration direrction of light polarized thereby forms an angle with respect to the vibration direction of light polarized by the first polarizer. The liquid crystal is responsive to different magnitudes of the electric field for the display of perceived color differences. The display is interfaced with a computer via circuitry which converts color display information produced by the computer to drive signals for applying the electric field in the different magnitudes across selected ones of the electrodes in order to display the perceived color differences. The display is part of a panel for use with a projector.

25 Claims, 9 Drawing Sheets

OTHER PUBLICATIONS

Dresser, M. J., "Digital Displays for the Overhead Projector", Am. J. Phys. 52(4), Apr. 1984.

Scheffer, T. J., "Direct-Multiplexed Liquid Crystal Displays", Society for Information Display, May 11 and 15, 1987, New Orleans, LA (Seminar No. S-4).

ASCII Corp./Nippon Gakki Co., Ltd., "V6355 LCDC Technical Data Book".

ASCII Corp./Nippon Gakki Co., Ltd., "PCDC V6366 Applilcation Manual".

Scheuble, B. S., "Liquid Crystal Displays with High Information Content", SID, 1988 Seminar/Literature Notes, May 27, 1988, Publ. #ISSN 08 87-915X.

"Great Graphics", PC Magazine, vol. 7, No. 5, Mar. 15, 1988.

Telex Communications, Inc., "Product Profile", 2/87.

Chisholm Associates' Video Image Projector ("VIP"), Photographs of the VIP.

Uchida, T., "Multicolored Liquid Crystal Displays", Optical Engineering, May/Jun. 1984, vol. 23, No. 3.

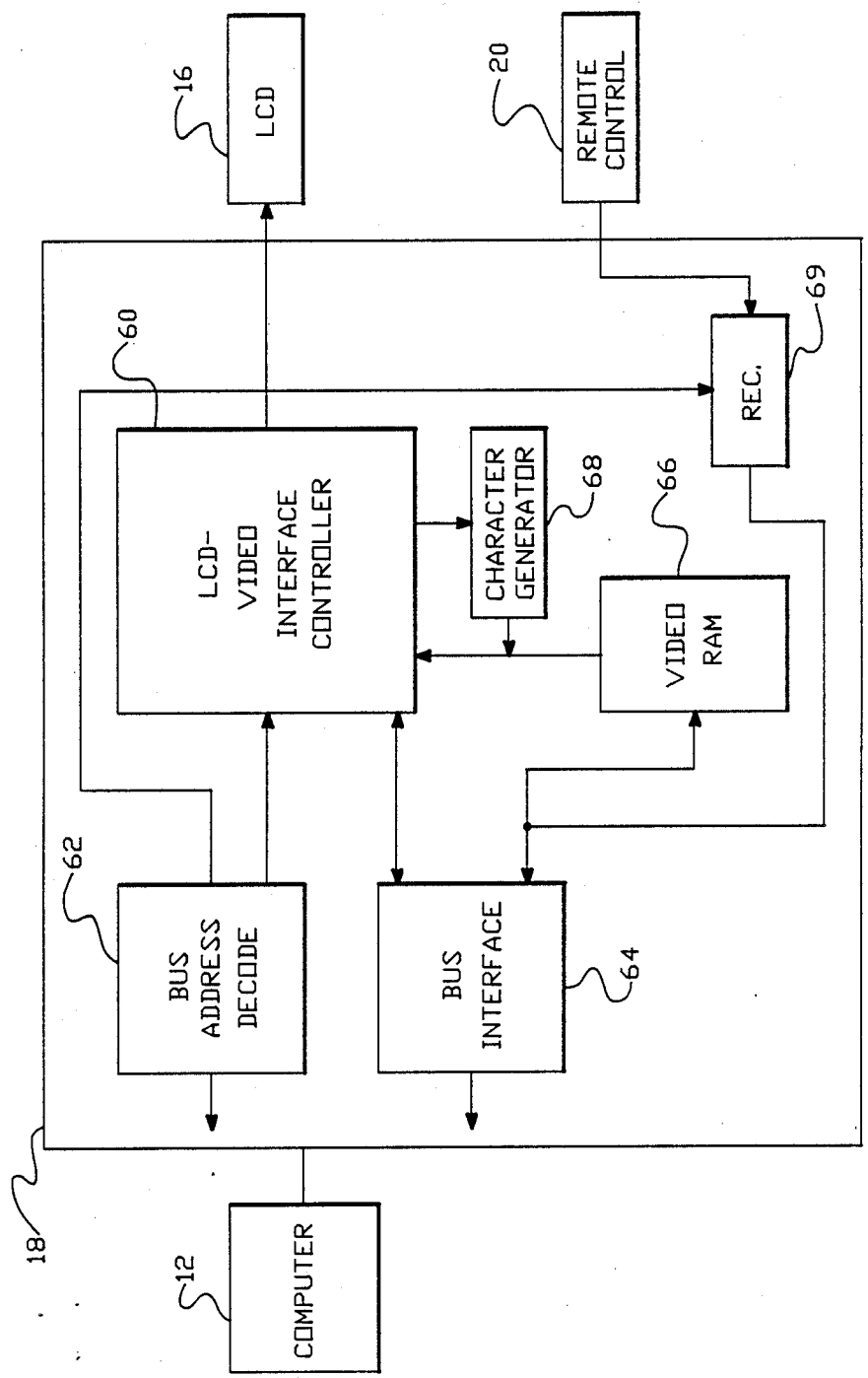

COLOR GRAPHIC IMAGER UTILIZING A LIQUID CRYSTAL DISPLAY

BACKGROUND OF THE INVENTION

The present invention relates generally to graphic imagers, and more particularly to a liquid crystal computer image presentation system that produces perceived color differences.

Various systems have been utilized to present personal computer (PC)-generated graphics. These systems include: monitors, three beam projectors, transparencies or slides, and liquid crystal display-type devices. The liquid crystal display-type devices utilize electronics to convert display information generated by the computer into signals usable with dot-matrix liquid crystal displays. A standard overhead projector may then be combined with the liquid crystal display to present the image created thereby.

Examples of such devices include the MagnaByte 5110-A, for use with the Apple II family of computers, and the MagnaByte 5120-I, for use with the IBM XT PC, AT PC, and XT and AT compatible PCs. These particular devices are made and sold by Telex Communications, Inc., the assignee of the present application. They are monochromatic systems that will interpret and display RGB (red-green-blue) colors at different intensity levels of one particular color.

As a matter of fact, all liquid crystal computer image presentation systems of this type known heretofore display computer generated color data only in shades of gray. Since these devices are unable to display varying colors, they may fail to project a complete color graphic picture as intended. Moreover, since the display is at different intensity levels of one particular color, it is not as aesthetically pleasing nor as easily read as the display on the computer monitor.

The system of the present invention is the first liquid crystal computer image presentation system of its type to display perceived color differences. The system is able to project a colorful representation of color text or graphics viewable on a PC display screen.

The system, in effect, transforms the color data that appears on a computer monitor into an electronic transparency of selected colors. When placed on an overhead projector, the color data and/or graphics generated by the computer can be simultaneously projected onto any wall or screen. No additional hardware or software is required.

In view of the foregoing, an object of the present invention is to provide a liquid crystal computer image presentation system that maps or assigns computer-generated color data into a limited-color gamut for a display of perceived color differences.

SUMMARY OF THE INVENTION

As may be seen hereinafter, the display apparatus of the present invention comprises a liquid crystal cell including a liquid crystal material, a plurality of electrodes for applying an electric field across the liquid crystal material, and first and second polarizers. The first polarizer is located at a viewing side of the cell and the vibration direction of light polarized thereby is non-parallel to the optic axis of the liquid crystal material at its front boundary layer. The second polarizer is located on the side of the cell remote from the first polarizer and the vibration direction of light polarized thereby forms an angle with respect to the vibration direction of light polarized by the first polarizer. The liquid crystal is responsive to different magnitudes of the electric field for the display of perceived color differences. The display further includes means for applying the electric field in varying magnitude across selected ones of the electrodes to display the perceived color differences.

BRIEF DESCRIPTION OF THE DRAWINGS

The present invention will be described in more detail hereinafter in conjunction with the drawings wherein:

FIG. 5 is a schematic block diagram representation of the interface card electronics that may be utilized in the system of the present invention;

DESCRIPTION OF THE PREFERRED EMBODIMENTS

Figure 1:
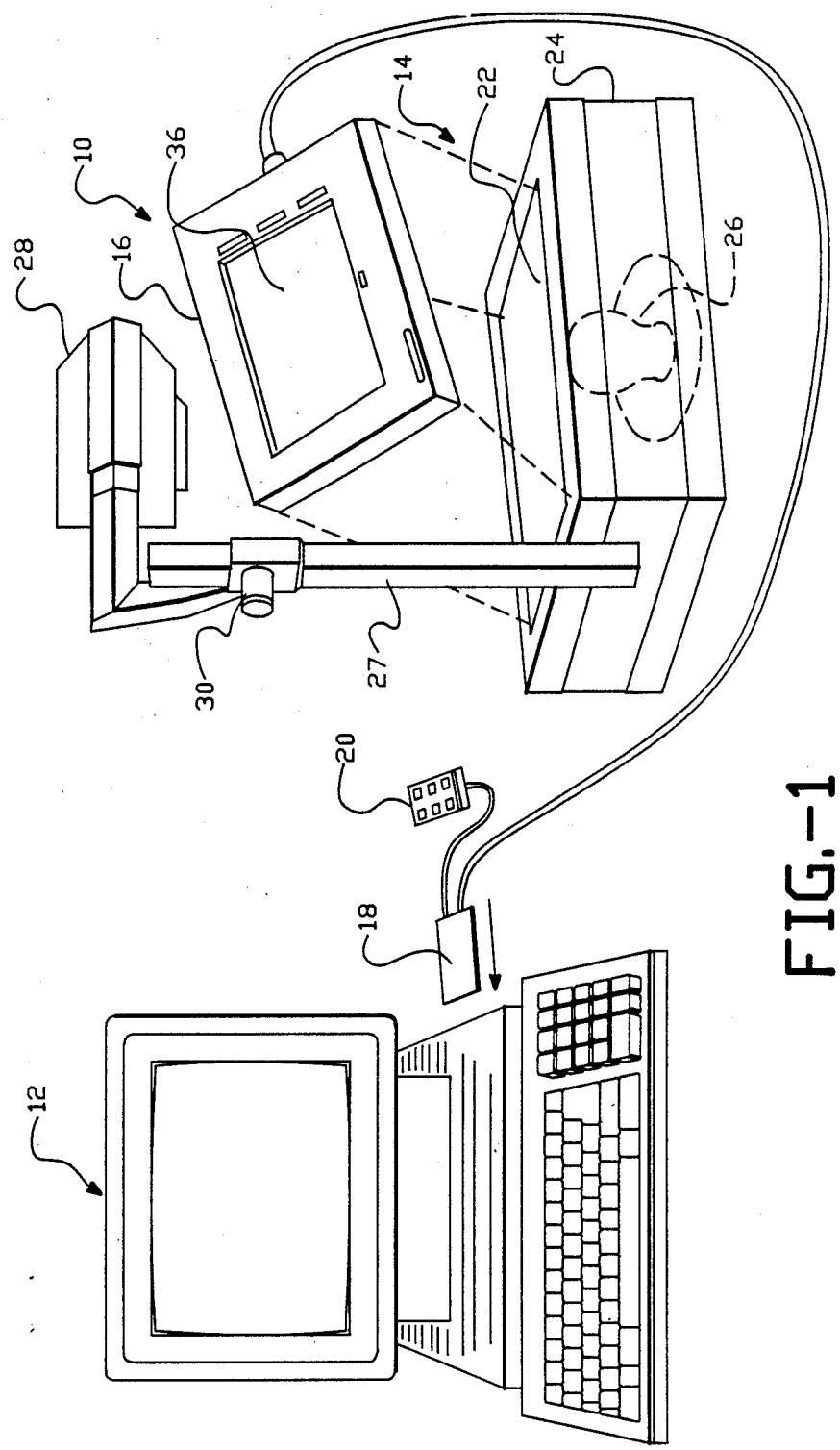
FIG. 1 is a schematic representation of the system of the present invention utilized with a computer and an overhead projector.

Referring now to the drawings, in which like components are designated by like reference numerals throughout the figures, attention is first directed to FIG. 1. FIG. 1 shows the system of the present invention, represented generally by reference numeral 10, as utilized with a personal computer (PC) 12 and a standard overhead projector 14.

The system includes a liquid crystal display (LCD) palette or panel 16, an interface card 18 and a remote control unit 20. As will be described in more detail below, palette 16 and remote control unit 20 are connected to appropriate circuitry on interface card 18. The interface card or board fits into any full-sized expansion slot of a PC, such as an IBM XT PC, AT PC, or XT and AT compatible PCs.

Remote control unit 20 may be connected to the interface card by a 12 foot cable. Alternatively, the cable may be eliminated, and remote control unit 20 may be an infrared unit, which, as is well known in the art, utilizes infrared light-emitting diodes and detectors for communicating information. The remote control unit may include the following functions: screen off/on, contrast control, forward/reverse control which controls the computer via software, and normal/reverse control which changes background color.

The LCD panel 16 may also include a 12 foot flexible cable that electrically connects the panel to interface board 18. The panel 16 is adapted to be positioned on the transparent or translucent stage 22 of projector 14, e.g. a 3M Model 2100 AJCT. The cord or cable that connects panel 16 to the interface card is preferably permanently attached to the side of the panel to prevent inadvertent disconnection.

As is known, the projector includes a base housing 24 and a broad spectrum light source 26, such as an incandescent light, located within the housing. Upward from housing 24 is a support post 27 which supports an optical system 28 that includes a reflector for reflecting the image produced on stage 22 onto a wall or screen. The optical system 28 may include appropriate means 30 for adjusting the height thereof as may be required to focus the image on a wall or screen. Thus, when panel 16 is placed on stage 22, the image or information produced by the LCD panel is projected and displayed by means of the overhead projector.

Figure 2:
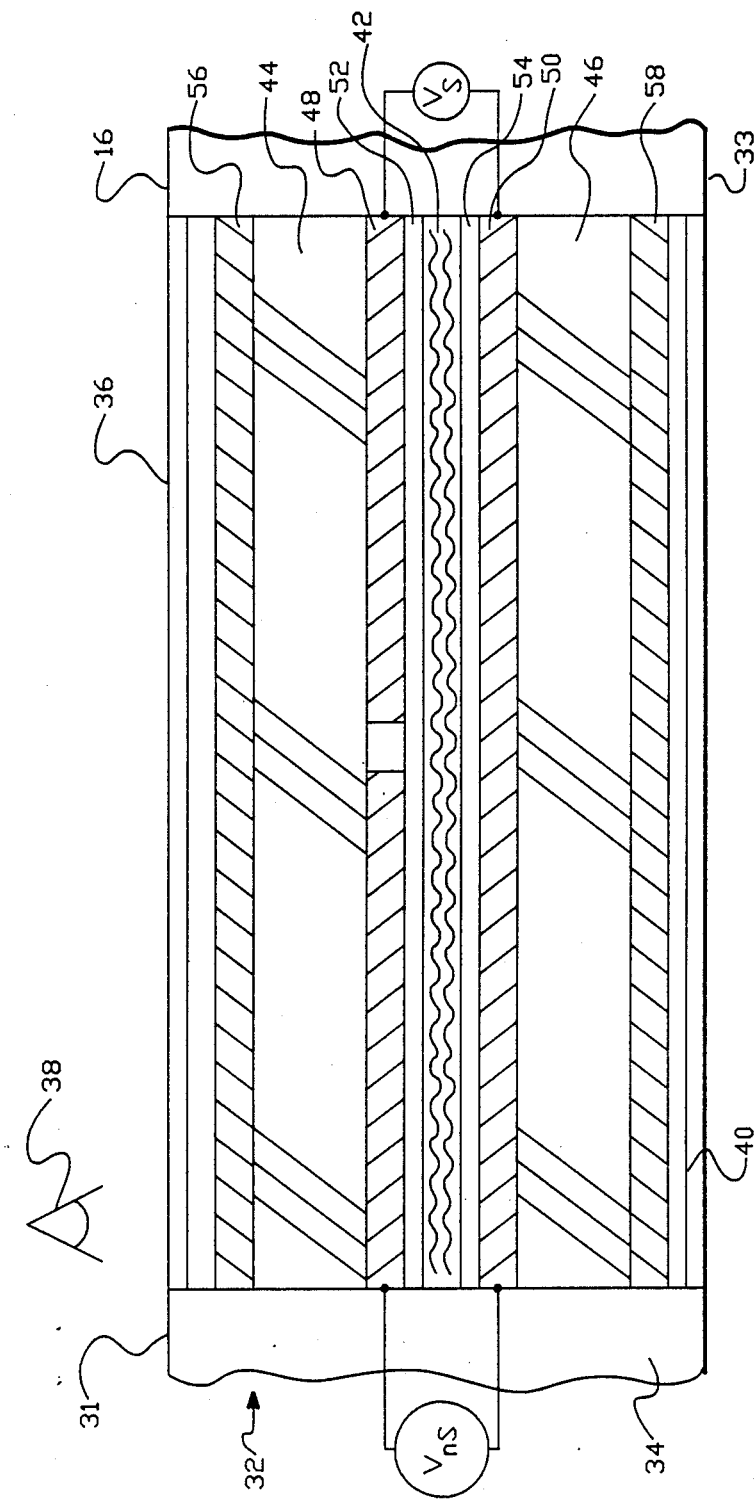
FIG. 2 is a schematic side view of a portion of the liquid crystal panel of the system of the present invention.

LCD panel 16 includes a liquid crystal cell, represented generally by reference numeral 32 in FIG. 2. The panel housing 34 is preferably constructed of impact resistant or rigid materials to protect the internal components, such as cell 32, and has non-slip rubber feet (not shown) for preventing the panel from sliding off surface 22 of the projector.

Palette 16 also has a built in cooling system. A fan and a series of ventilation grids (both not shown) assure a continuous fresh air flow across the entire surface of liquid crystal cell 32 to maintain an even display temperature. A "fan on" light, which may be a light emitting diode (LED), on the side of the palette indicates when power to the palette is on. A contrast potentiometer (not shown) may be located on the side of the panel. It is active when the remote control is not connected.

Panel 16 includes a front opaque portion 31 and a rear opaque portion 33 which cooperate to form a housing 34. Liquid crystal cell or module 32 is contained within the housing. A glass window or aperture 36 is formed on the front surface of the housing. A second glass window or aperture 40 is formed at the back surface of the housing. An air space is formed between each of the windows and the polarizers, discussed below, of the cell. The front surface of the panel is the side of the panel that may be observed by an observer 38 when the panel is disposed on surface 22 of the projector.

Windows 36 and 40 are optically transparent to permit the transmission of light from light source 26, for example, through liquid crystal cell 32. The windows may be designed to snap within housing 34 for easy removal for cleaning. Additionally, transparency markers may be used to write on the windows.

The liquid crystal cell 32 includes a liquid crystal material 42 disposed between substrates 44 and 46. The substrates may comprise respective glass plates, and the liquid crystal material, as will be discussed in more detail below, is preferably a supertwisted nematic (STN) liquid crystal material. Transparent electrodes 48 and 50 are formed on the surfaces of substrates 44 and 46, respectively, facing toward liquid crystal material 42. Electrode layers 48 and 50 may be applied to their respective substrates by evaporation, by vacuum deposition, by sputtering, by printing, or by any other technique desired. The electrodes may be formed from indium tin oxide (ITO).

The electrodes may comprise any appropriate pattern of conductors. Preferably, electrodes 48 and 50 comprise a 640×200 dot matrix arrangement. This arrangement would actually be divided in two, as is well known in the art to improve the contrast ratio of the display, along the middle of the row electrodes to provide, in effect, two panels each having a 640×100 dot matrix configuration. As is well known in the art, each half of this double matrix arrangement may be driven independently but simultaneously by suitable row and column drivers (see FIG. 6).

As noted, windows 36, 40, substrates 44, 46, and electrodes 48, 50 are all optically transmissive so that the liquid crystal material 42 is capable of controlling the transmission of light therethrough in response to an electric field applied across the electrodes.

The liquid crystal cell further includes alignment layers 52 and 54, and polarizers 56 and 58. The alignment layers are located on opposite sides of liquid crystal material 42. The combination of the bulk twist of the liquid crystal material and the alignment layers produce the requisite twist. The polarizers, located at the front and rear surfaces of the liquid crystal cell, are arranged, as will be explained below, to produce the desired color output.

As noted, liquid crystal material 42 is a STN liquid crystal material. Nematic liquid crystals are one class of liquid crystal materials. Other classes are cholesteric and smectic. Nematic liquid crystal is anisotropic. The effective dielectric constant and the effective refractive index varies with the application or not of an electric field across the liquid crystal material.

A twisted nematic (TN) display includes a nematic liquid crystal material oriented along defined directions vis-a-vis the surfaces of the alignment layers. In a TN display, the nematic liquid crystal material undergoes a continuous 90° twist in the bulk regions between the respective alignment layers. A sufficient electric field applied across the liquid crystal material eliminates the twist, resulting, as is known in the art, in a change in the display.

In STN displays, the nematic liquid crystal may maintain a twist angle from about 180° to about a critical twist angle of 270°. For twist angles of more than 270°, the display shows bistability.

The STN liquid crystal mixture includes a nematic liquid crystal material with a few percent of a cholesteric dopant having either right-or-left handed forms. The "hardness" of the dopant molecules imparts a macroscopic twist to the nematic structure. The degree of this twist is measured by the pitch length.

In the context of the present invention, the term STN or supertwisted nematic liquid crystal refers to any display or cell wherein the nematic liquid crystal material has a twist angle of between about 180° and 270°. The majority of STN cells commercially available today have twist angles of between 180° and 240°.

As discussed, cell 32 includes polarizers 56 and 58 disposed at opposite sides of the cell. They are neutral linear polarizers in order to avoid color distortion. For a left-handed twisted STN cell, polarizer 56 may be arranged so that the vibration direction of the polarized light makes an angle of approximately 30° ($\pm 5°$) with the optic axis of the liquid crystal material at the front boundary layer, i.e. at the interface between alignment layer 52 and liquid crystal 42, measured in a clockwise sense looking along a light beam. The vibration direction of light polarized by the second polarizer forms an angle (which may include 0°) with respect to the vibration direction of light polarized by the first polarizer. In the example given, the corresponding alignment angle for polarizer 58 may be approximately $-30°$ ($\pm 5°$). That is, the optical axes of the polarizers 56 and 58 may form an angle of about 30° and $-30°$, respectively, to the rubbing direction of the respective alignment layers.

The angles specified are exemplary. They do not necessarily have to be complementary pairs. Adjusting the angle of the polarizers adjusts the range of colors that may be displayed.

With the polarizer combination discussed (30°, −30°), the liquid crystal cell or the pixels thereof in the select state ($V_s$) have a pale yellow appearance, and the liquid crystal cell or pixels thereof in the nonselect state ($V_{ns}$) appear blue. This is called the blue mode. Rotating either of the two polarizers by 90°, results in a complementary mode of operation having a bright yellow appearance in the nonselect state and a dark appearance in the select state. This is the yellow mode.

The STN cell that forms part of the system of the present invention is one which exhibits a plainly discernable color gamut between the selected and nonselected states. At this time, very few LCD manufacturers produce an LCD with a sufficient color gamut to be useful in the present invention. In a preferred embodiment, cell 32 is one purchased from EPSON America, Inc., Torrance, Calif., Part No. TCM-A275. This cell exhibits an acceptable color gamut. It comes as a subsystem with row and column drivers and a voltage network used to generate the basic waveforms needed for rms multiplexing. The twist angle is about 240°. The cell is operated in the blue mode.

TN and STN cells are described in a paper entitled "Direct-Multiplexed Liquid Crystal Displays", by T. J. Scheffer, given at the Society for Information Display, May 11 and 15, 1987, New Orleans, La. (Seminar No. S-4), which is hereby incorporated by reference.

The color generating mechanism utilized in the present invention is tunable birefringence. A birefringement liquid crystal layer with an optical retardation of between about 0.3 um and about 1.6 um produces a color when placed between two polarizers. The color produced will be a direct function of the effective birefringence of the layer, its thickness, the dispersion (if any) in the layer's birefringence, and the polarizer orientations. Of course the color content of the light source used will also affect the color produced.

In the case of STN cell 32, the effective birefringence of the liquid crystal layer can be adjusted by appropriate modification of the applied rms field. The color produced will change in response to this field.

The fully nonselected and selected states of the liquid crystal of the STN cell correspond to two states of optical retardation within the liquid crystal layer. For a blue mode, this may be about 0.82 um and about 0.38 um, respectively. The nonselected color is blue and the fully selected color is pale yellow. At field states between these two extremes lie four other hues, namely, indigo, violet, red and orange.

The relationship which describes the optical retardation (OR) of the liquid crystal layer in the STN cell is:

$$OR = \Delta n \cdot d \cdot \cos(\theta),$$

where "$\Delta n$" is the birefringence of the liquid crystal material, "d" is the cell thickness, ($\theta$) is the average tilt angle of the molecular orientation, and "$\Delta n \cdot \cos(\theta)$" is the effective birefringence of the liquid crystal layer.

When a field which is above threshold is applied to the cell, ($\theta$) undergoes a large change as the molecules begin to reorient with the applied field. As the field is increased, ($\theta$) also increases until the fully selected field value is reached.

Corresponding to this increase in ($\theta$) with increasing field is a decrease in the effective birefringence of the cell layer. Therefore, as the field is increased, the output color of the cell gradually changes from the nonselected value to the fully selected value. In the case of the blue mode, the output color traverses the color gamut, as will also be described below, from blue to pale yellow.

It is important to note that cell 32 behaves as a variable color filter not as a set of fixed color triads whose intensities are varied. A typical color display (for example, a color CRT or other three color device) does not act as a variable color filter since the RGB color elements are all fixed in color space. The observer can see what appears to be a wide range of colors with this kind of "true" color device because the human eye performs a spatial integration of the color triads so the brain recognizes the resultant composite color as a single color. Since all colors can be broken down into a set of three color primaries, the true color arrangement allows the user to fairly accurately represent the color of an external source image, whether it be photographic, video, or computer generated.

The color cell 32 embodied in the present invention does not lend itself as readily to the task of accurately rendering the color or colors of a source image. Instead, the birefringent color cell will only produce those colors within its color gamut or linear combinations of those colors. Since these colors are not necessarily primary, it becomes very difficult to faithfully represent the colors of a true color image such as would be generated on a computer with a color monitor. Therefore, the true color source image must be assigned or mapped into the limited color gamut of the birefringent color cell 32. This produces a "false" color representation of the source image.

As another distinguishing characteristic of the birefringent color cell, the specific color gamut obtained using the driving system (to later be described) can be continuously adjusted between end point values by changing the operating voltage of the cell or LCD module. This allows the user a limited ability to select the specific color gamut to be used.

To this end, the system includes an LCD-video interface controller 60 (see FIG. 5). The controller performs most of the control functions of the LCD panel and presents an interface to the PC system. The controller drives the pixels of cell 32 based on the information contained in the display memory of the computer. The controller is preferably compatible with the video display controller chip used in the IBM color graphics adapter (CGA) and monochrome display adapter (MDA).

The controller is programmed to map computer-generated RGB colors into the selected colors that are displayed by LCD panel 16. This is accomplished by means of multiplexed signals applied to the liquid crystal cell to drive selected pixels. The controller can produce eight levels of control, although only five are used in the system described herein.

Frame multiplexing of the LCD signals is utilized in PC bus oriented LCD controllers such as the Yamaha V6355 and V6366 controllers, which are available from Yamaha International Corp., 6600 Orangethorp Avenue, Buena Park, Calif. 90620. These devices are described in the following brochures: "V6355 LCDC Technical Data Book" and "PCDC V6366 Application Manual", both of which are hereby incorporated by reference. Another example of a video to LCD controller is the Hitachi HD66840F LCD-video interface controller, available from Hitachi, Ltd., Semiconductor and Integrated Circuits Division, Tokyo, Japan. In a preferred embodiment constructed heretofore, controller 60 was the Yamaha V6355 controller.

Figure 3:
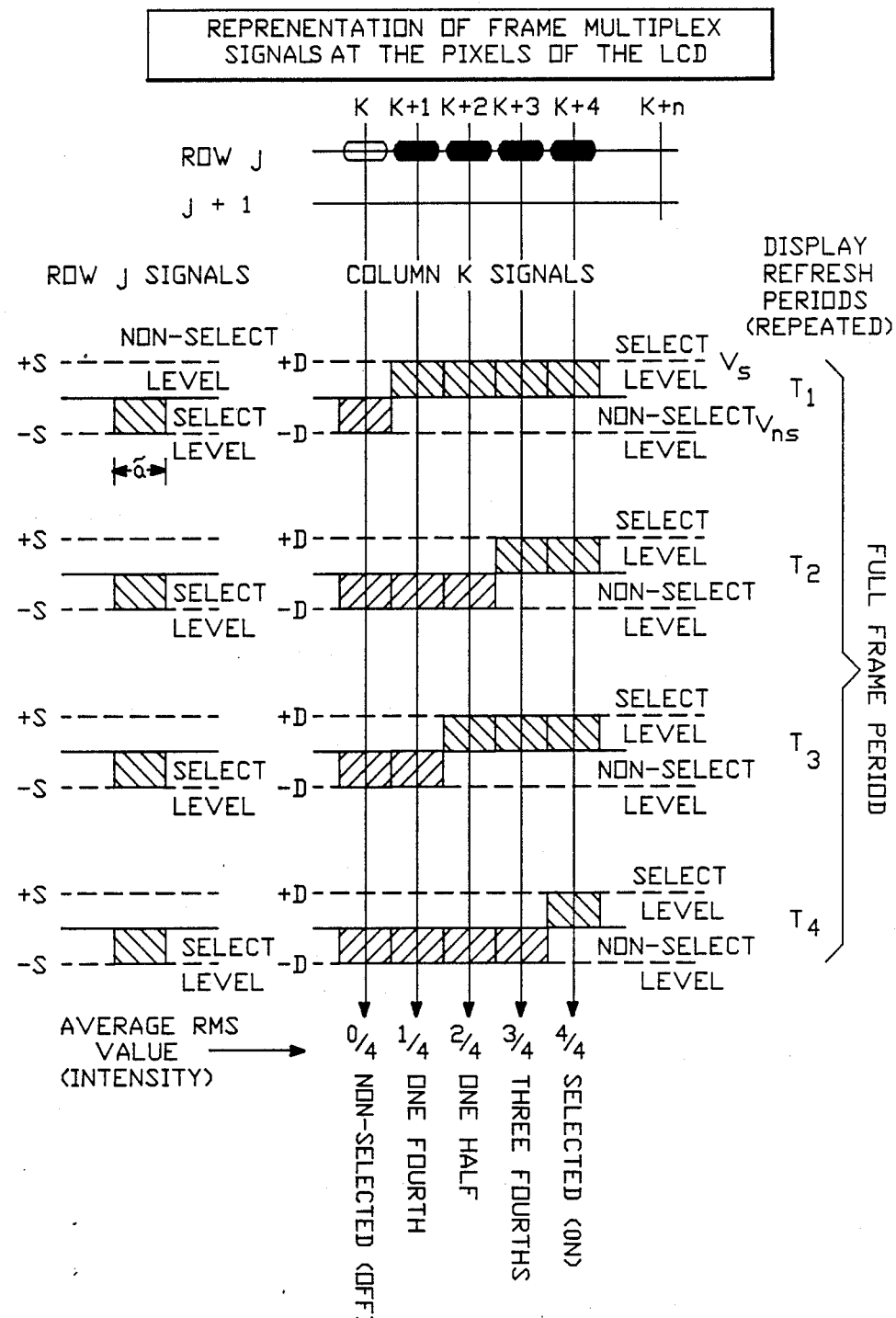
FIG. 3 is a timing diagram illustrating the manner in which the liquid crystal panel may be driven.

Frame multiplexing takes advantage of the relatively slow switching speed of STN cell 32 to hold a pixel in a partially energized state, thus showing an intensity level between "full on" (pale yellow) and "full off" (dark blue). In frame multiplexing, the frame period, which is normally defined as one refresh cycle of the display, is redefined as four refresh cycles of the display. A pixel may thus be turned "on" for only a portion of a full frame period and this time may be averaged over four periods to produce electric fields of varying discrete magnitudes. For example, for five control levels, a pixel may be "on" for 0 of 4, 1 of 4, 2 of 4, 3 of 4, or 4 of 4 individual periods. The timing diagram of FIG. 3 schematically represents this frame multiplexing scheme.

As illustrated, the rows are sequentially pulsed with a row strobe pulse of amplitude $-S$ and width $\bar{a}$, independent of the information to be displayed. When the last row is pulsed the process begins anew at the top, starting the next refresh period, in which each refresh period $T_1$, $T_2$, $T_3$, and $T_4$ comprise a scan through the one hundred rows. As mentioned, the display comprises two $640 \times 100$ pixel arrangements driven independently but simultaneously.

Each column electrode of the display gets a data waveform whose amplitude switches between the nonselect level $V_{ns}$ ($-D$) and the select level $V_s$ ($+D$), depending upon the information content of that column. If the pixel at the intersection of row j and column k (pixel (j,k)) is nonselected, for example, then column k gets the nonselect level $V_{ns}$ ($-D$) in the same time interval $\bar{a}$ that row j gets the strobe pulse $-S$. These pulses have the same polarity so the liquid crystal sees the potential difference $S-D$. Similarly, the column electrode of a selected pixel gets a select level voltage $V_s$ ($+D$) coincident with its row strobe pulse $-S$ of opposite polarity so the liquid crystal will see the larger potential difference $S+D$.

This addressing scheme fixes or sets the rms voltage appearing across any pixel at either of two possible values—the select level $V_s$ and nonselect level $V_{ns}$.

Several display refresh periods $T_1-T_4$ are combined to form a full frame period. A particular pixel may be selected to be on for some percentage of this period. This will produce different rms voltages between the select control level (4/4) and the nonselect control level (0/4). For example, pixel j, k+2 may be selected in display refresh periods $T_1$ and $T_3$, and nonselected in display refresh periods $T_2$ and $T_4$, producing an average rms voltage of half intensity (2/4). Similarly, pixel j, k+3 may be selected in display refresh periods $T_1$, $T_2$ and $T_3$, and nonselected in display refresh period $T_4$ to produce an average rms voltage of three-fourths intensity (¾). And if pixel j, k+1 is selected only in period $T_1$, an average rms voltage of one-fourth intensity (¼) will be produced across the liquid crystal material between row electrode j and electrode column k+1.

The signals on the rows and columns are alternated in polarity to ensure there will be no long term DC voltages which could damage the display through electrochemical reactions. The ratio of "on" pixels to "off" pixels may also be controlled during each frame period to reduce the amount of image flicker or beating.

An alternate method of producing intermediate voltages is to use the more expensive pulse width modulated (PWM) display drives. In this case, the necessity of frame multiplex is obviated.

As discussed and as shown in Table 1, the different control levels applied across STN cell 32 produce distinct colors. Thus, the system displays the computer-generated RGB colors as five distinct colors (from pale yellow to dark blue) as shown. The particular intensity levels for the color produced is also listed. For example, in the normal and blue modes, where a pixel is "on" two of four individual periods (2/4), the RGB colors cyan and green are displayed as orange. At the point where the control level is at three-quarters intensity (¾), the RGB colors magenta and red appear as deep yellow (gold).

TABLE 1

| COLOR SHOWN ON COLOR MONITOR | COLOR IN THE "NORMAL" MODE | COLOR IN THE "REVERSE" MODE |
|---|---|---|
| White | Pale Yellow | Dark Blue |
| Gray | (4/4) | 0/4 |
| Yellow | | |
| Brown | | |
| Magenta | Deep Yellow | Violet/Purple |
| Red | (Gold) (3/4) | 1/4 |
| Green | Orange (2/4) | Orange |
| Cyan | | 2/4 |
| Blue | Violet/Purple | Deep Yellow |
| | (1/4) | (Gold) 3/4 |
| Black | Dark Blue | Pale Yellow |
| Dark Gray | (0/4) | 4/4 |

The colors achieved by the system are also subject to manual contrast adjustments either by means of remote control 20 or by the contrast potentiometer located on panel 16. Additionally, the system may be operated in either a normal or reverse mode. Selected pixels in the normal mode are nonselected in the reverse mode, and nonselected pixels in the normal mode are selected in the reverse mode. As shown by Table 1, different colors are displayed.

Figure 4A:
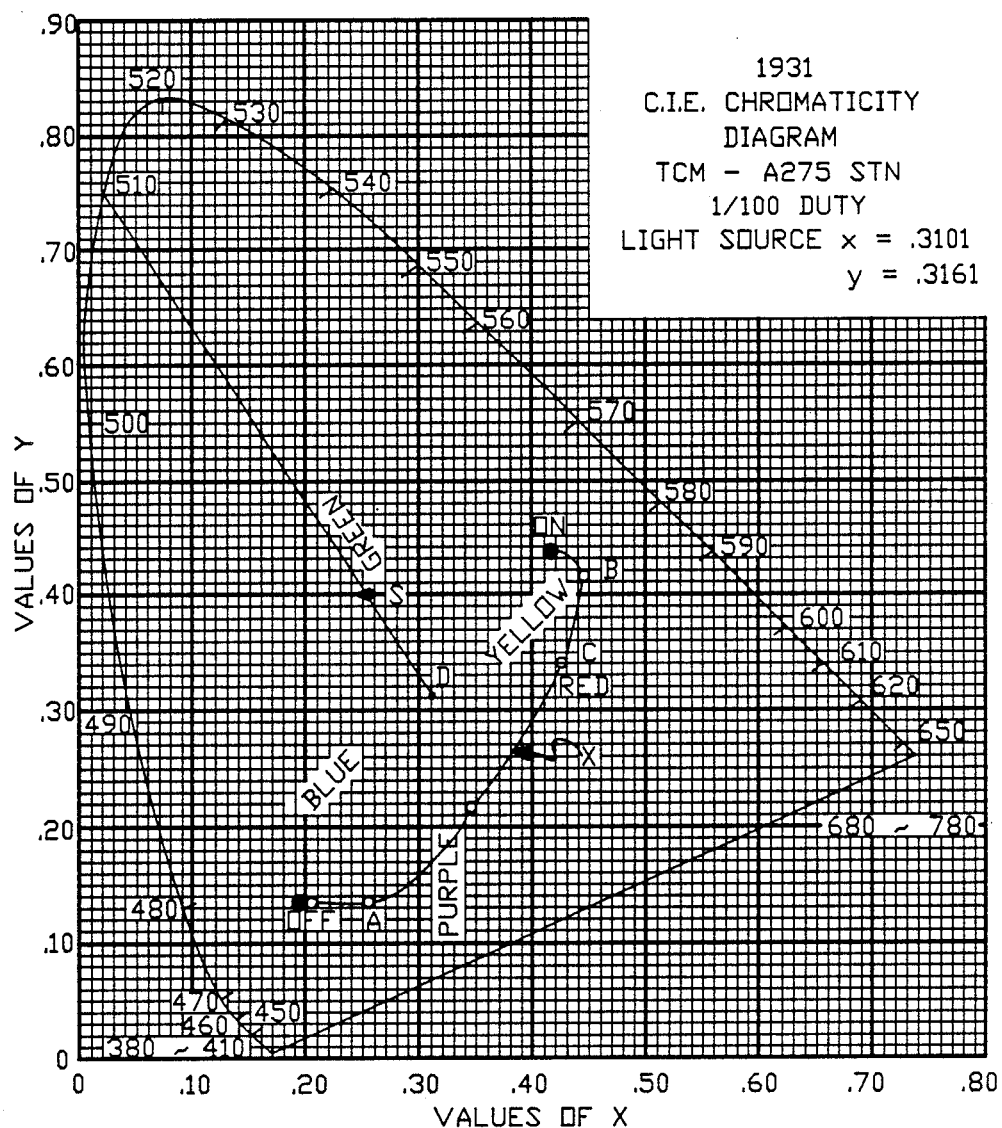
FIGS. 4A and 4B are chromaticity diagrams illustrating color patterns that may be produced by the system of the present invention.
Figure 4B:
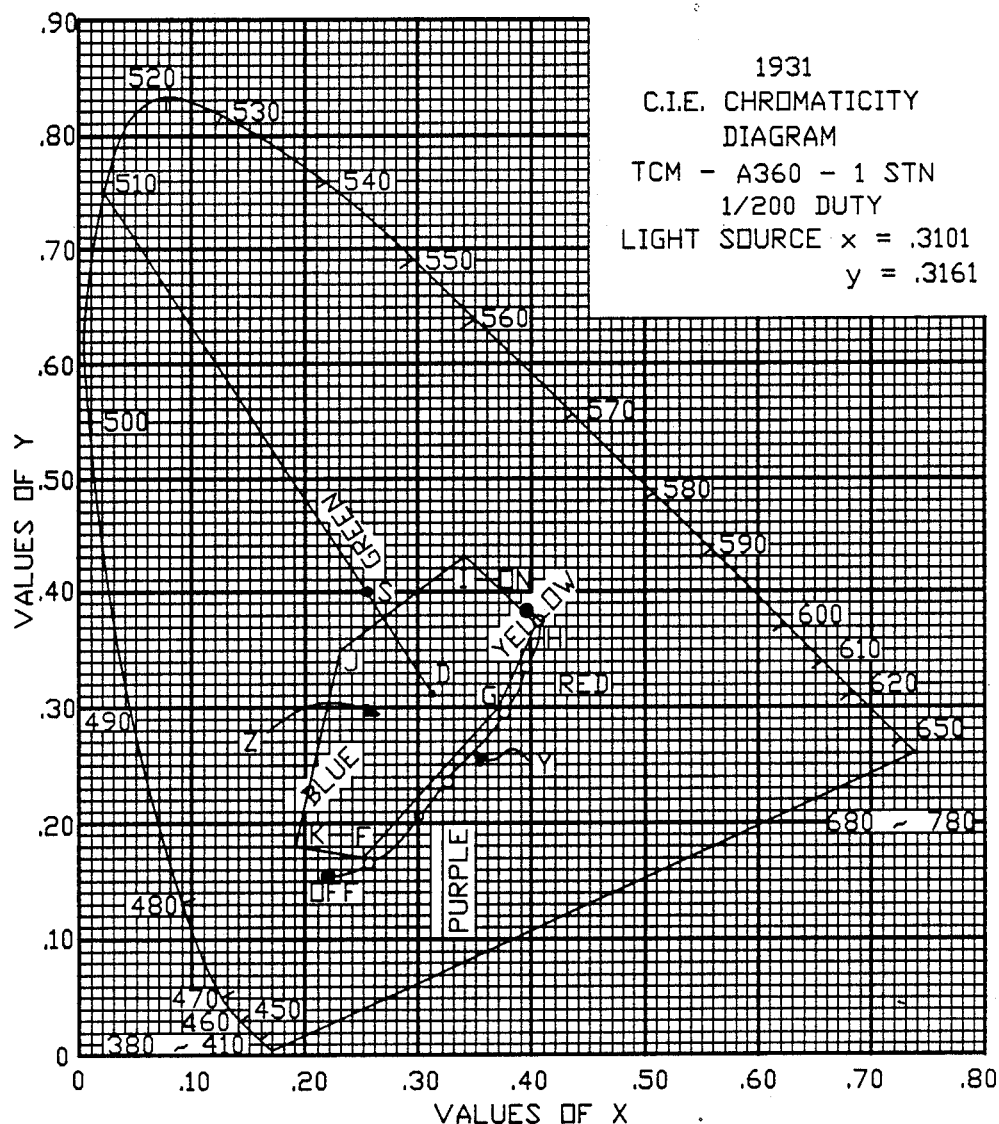

FIGS. 4A and 4B are 1931 C.I.E. (Commission Internationale d'Eclairage) chromaticity diagrams. They illustrate the colors produced by different LCD panels that may be utilized in the present invention. FIG. 4B further defines an envelope or region of colors that is not usable in the present invention.

The operating curves of FIGS. 4A and 4B were both generated using a light source having a color located at point "D" (x=0.3101, y=0.3161). FIG. 4A is a chromaticity diagram of the EPSON cell No. TCM-A275 operated at a 1/100 duty cycle in the blue mode. If the cell was operated in the yellow mode, a curve (not shown) on the opposite side of the achromatic equal energy point (x=0.333, y=0.333) would be produced.

This diagram shows the colors (along operating curve "x") achievable with this cell. Specifically, at the point "on" (x≈0.415, y≈0.430), the color displayed is pale yellow. At the point "off" (x≈0.195, y≈0.130), the color displayed is dark blue. Other display colors for various control voltages (e.g. 2/4 and ¾) lie along the operating curve between "on" and "off". For example, at control point "A" (x≈0.260, y≈0.140), the display color is violet/purple. At point "B" (x≈0.445, y≈0.410), the display color is deep yellow (gold), and at point C, the display color is orange (x≈0.425, y≈0.340). (See also, Table 1).

FIG. 4B is a chromaticity diagram of another STN cell that may be utilized in the system of the present invention. The cell has a $640 \times 400$ dot matrix arrangement driven at 1/200 duty cycle in the blue mode. It is also available from EPSON as Part No. TCM-A360-1.

At point "on" (x≈0.395, y≈0.390), the color displayed is a less saturated yellow than the corresponding point in FIG. 4A. At point "off" (x≈0.220, y≈0.155), the display color is violet blue. Again, other display colors lie between "on" and "off" along operating curve "y".

These diagrams illustrate that at different levels of control voltages there are perceived color differences. These perceived differences are utilized to display information. The perceived color differences illustrated by the blue mode panel shown in FIG. 4B are marginally acceptable for a display of information in the context of the present invention.

It is the nature of the birefringence colors effect and of STN cell design that a wide range of cell parameters may be used to produce an acceptable display device. This is explained in the following paper: "Effect of Various Parameters on Matrix Display Characters of SBE Liquid Crystal Cells," T. Uchida, et al., Proceedings of the 6th International Display Research Conference, Paper 9.1, Sept. 30 –Oct. 2, 1986, which is hereby incorporated by reference. For this reason, a color envelope "Z" on the 1931 C.I.E. diagram (FIG. 4B) is used to define the system's operating characteristics. As will be discussed, colors inside the envelope provide unacceptable false color rendering.

As shown by FIG. 4B, an envelope or bounded region "Z" is defined by the following points connected by straight lines: F(x≈0.25, y≈0.17), G(x≈0.38, y≈0.30), H(x≈0.40, y≈0.38), I(x≈0.34, y≈0.43), J(x≈0.23, y≈0.35), and K(x≈0.19, y≈0.18). The color points in this envelope are of very low saturation. They may display intensity variations but not readily perceivable color variations, which may result in high contrast but poor color discrimination.

It has been determined that an LCD cell having an operating curve where more than half of the color or control points fall within envelope "Z" will not produce the requisite perceived color differences. This occurs because the color saturation of the color points inside envelope "Z" is so low, it is difficult to readily perceive color (hue) shifts. Therefore, displays operating within this region are not acceptable even though they may be used in a monochrome environment.

The majority of the control points (e.g. 0/4, ¼, 2/4, ¾, 4/4) must fall outside of envelope "Z". The LCD cell of panel 16 must have such operating characteristics. An optimum cell would have control or color points in as many different hues as possible.

For illustrative purposes, the chromaticity diagrams of FIGS. 4A and 4B are that of blue mode STN cells.

The present invention also encompasses the use of STN cells which do not use the blue mode (e.g. the yellow mode), so long as the color gamut of the cell is sufficiently large to allow the unambiguous display of at least 4 colors.

As shown in FIG. 5, controller 60 is located on interface card 18, and is connected between computer 12 and LCD panel 16. As discussed, controller 60 is a PC bus oriented controller that, in one embodiment, produces five separate control levels.

Also located on interface card 18 is a bus address decode 62 and a bus interface 64. The bus interface buffers the signals received from the computer bus. It also passes data from the computer to video RAM 66. The address decode 62 selects when the system is active, i.e. whether the system is supposed to respond to the computer bus interface. The system of the present invention may operate in two different modes: the direct mode or the shadow mode. In the direct or real mode, the data from the host central processing unit (CPU) is transferred to and from controller 60. In the shadow or phantom mode, the system acts as a write only device; i.e., information is copied passively as it is being fed to the resident or native controller in the computer.

The controller 60 reads video RAM 66 and converts that information to suitable LCD signals for driving LCD panel 16. The video RAM stores display information generated by the computer for driving a selected pixel at a particular control level to produce a specific color. Thus, a certain colored pixel on the computer CRT will correspond to a particular pixel of selected color on the LCD display.

The character generator 68 forms the actual alpha-/numeric or graphic characters based on information received from video RAM 66. It formats a specific code into a specific bit pattern. For example, in the text mode, character generator 68 takes the ASCII code for the letter "A" and determines what pixels should be turned on to form an "A". The character generator is controlled by controller 60.

Remote control unit 20 is connected to the interface card 18 by a latch or receiver buffer 69.

Figure 6:
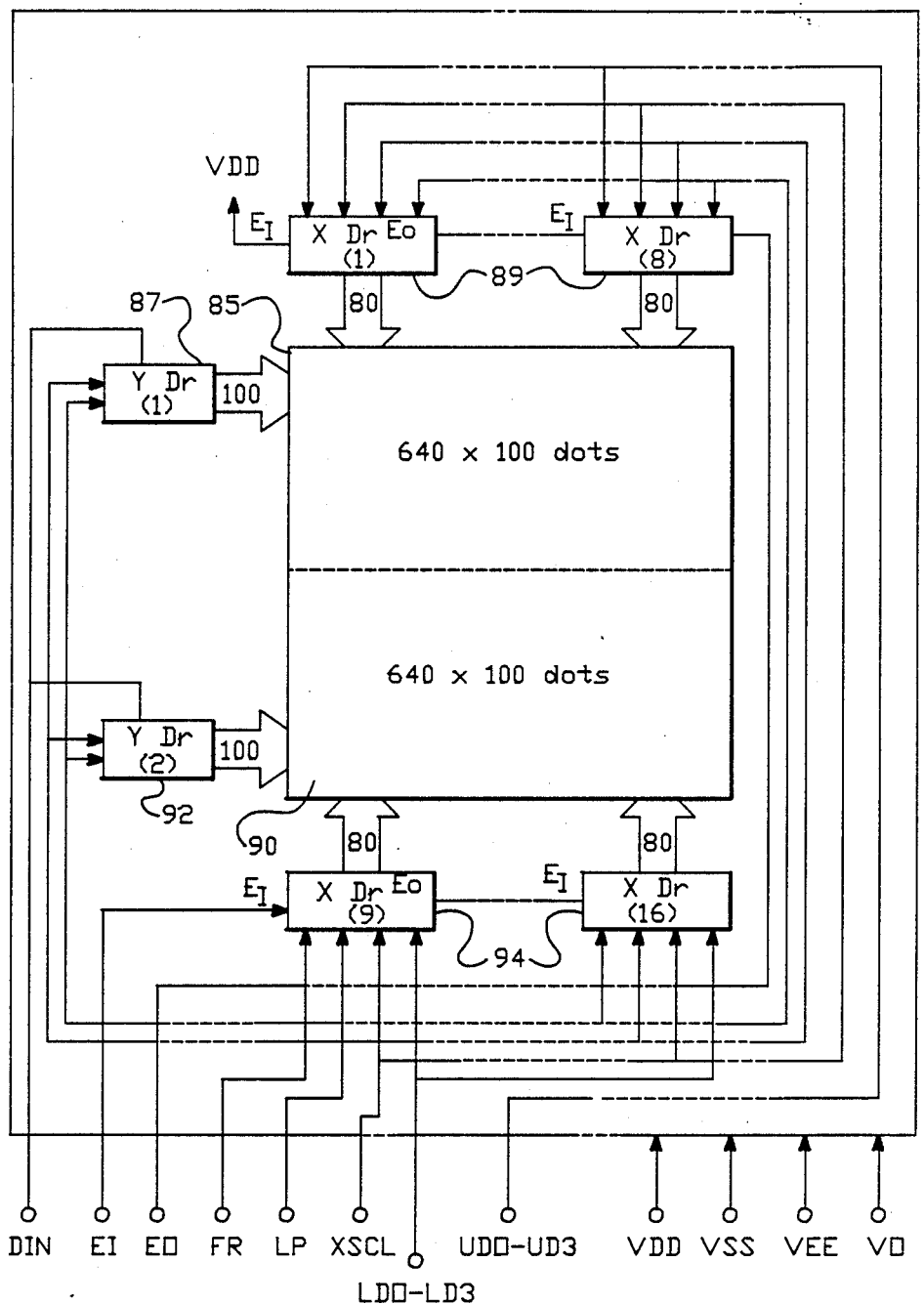
FIG. 6 is a schematic block diagram of the arrangement of the row and column drivers.

As shown in FIG. 6, appropriate row and column drivers are included with cell 32 for driving the liquid crystal display. The terminals for the drivers, their functions and the signals from the LCD controller (see FIG. 7B) are shown below in Table 2 (N/A=not applicable and N/C=no connection):

TABLE 2

| | | TERMINAL FUNCTIONS | | |
|---|---|---|---|---|
| SYMBOL | I/O | LCD CONTROLLER | NAME | FUNCTION |
| DIN | I | FLM | SYNCHRONIZING PULSE | ROW SCAN START UP PULSE |
| LP | I | LC | LATCH PULSE | DATA LATCH SIGNAL |
| VSS | I | N/A | GROUND | 0 V |
| XSCL | I | SCK | X SHIFT CLOCK | DATA SHIFT CLOCK |
| FR | I | M | FRAME PULSE | AC DRIVING SIGNAL |
| VDD | I | N/A | POWER SUPPLY | +5 V |
| VO | I | N/A | CONTRAST VOLTAGE | VOLTAGE FROM CONTRAST CONTROL |
| UD0–UD3 | I | LD0–3 | DATA INPUT | UPPER DISPLAY DATA |
| LD0–LD3 | I | L04–7 | DATA INPUT | LOWER DISPLAY DATA |
| VEE | I | N/A | POWER SUPPLY FOR LCD | VDD−VEE=MAX.22 V |

TABLE 2-continued

| | | TERMINAL FUNCTIONS | |
|---|---|---|---|
| SYMBOL | I/O | LCD CON-TROLLER | NAME | FUNCTION |
| EI | I | VDD | ENABLE INPUT | |
| EO | O | N/C | ENABLE OUTPUT | |

The row signal is multiplexed onto upper row array 85 by row driver 87 and lower row array 90 by row driver 92. Each is a one hundred position driver. The upper column array 85 is driven via eight eighty position column drivers 89, and likewise, the lower column array 90 is driven by eight eighty position column drivers 94.

Figure 7A:
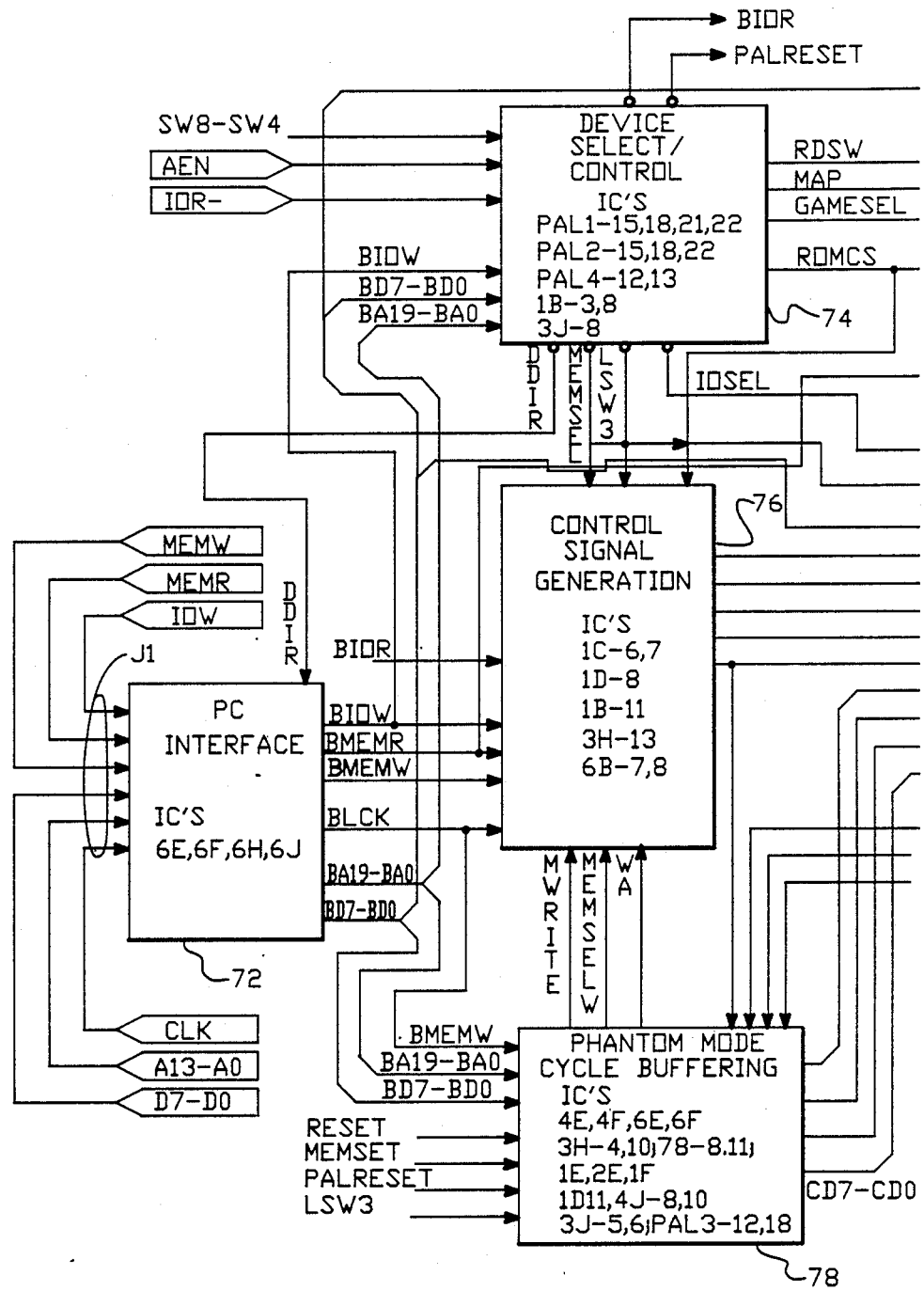
FIGS. 7A-7B illustrate a more detailed block diagram of the interface card electronics.
Figure 7B:
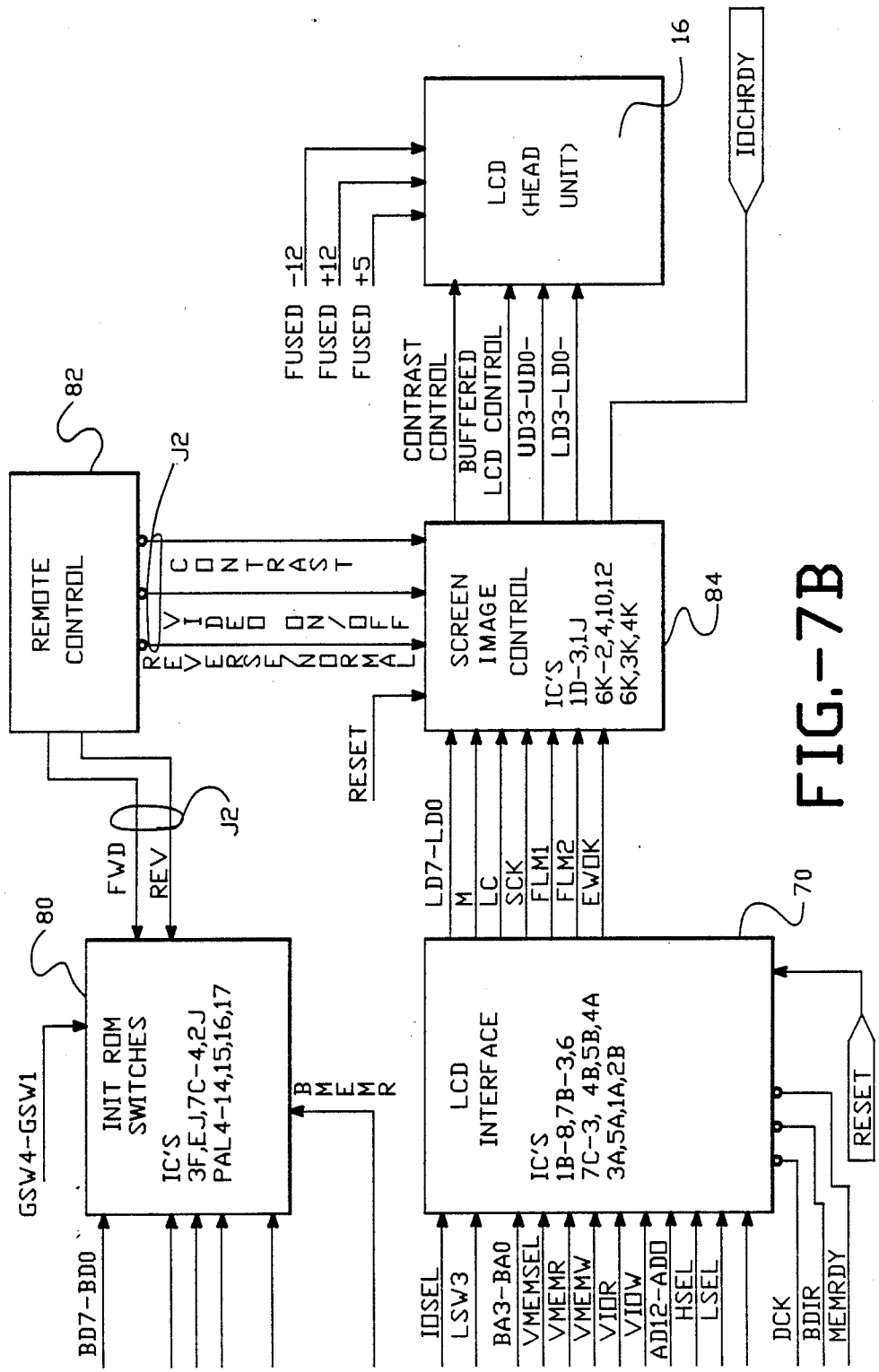

A more detailed block diagram representation is provided in FIGS. 7A–7B. The interface card described in reference to these figures is for use with IBM XT and AT PCs, and XT and AT compatible PCs. Another interface card that may be utilized in the present invention is described in the above-above referenced manual for the Yamaha V6366 controller beginning at page 88, which has been incorporated herein by reference.

LCD INTERFACE

The LCD interface 70 (FIG. 7B) includes controller 60 (in a preferred embodiment the Yamaha V6355 controller) and video RAM 66. As discussed, the controller converts the video signals from the computer to time multiplexed, signals for driving LCD panel 16.

PC INTERFACE

Connector J1 (FIG. 7A) interfaces control card 18 to the PC bus via PC interface 72, which corresponds to bus interface 64 of FIG. 5. Connector J1 is a standard 62 pin edge card connector. The component side is numbered from A1 to A31 (right to left) such that A1 and B1 are directly across from each other. J1 may be an IBM XT compatible connector only. It then does not attach to the extended AT control signals. If placed in an AT or AT compatible, it will appear as an 8 bit device, and a four wait state cycle will occur. The system can be used in AT compatibles with clock speeds to 10 MHZ, but the shadow mode can only correctly capture display data if the short term average data rate is less than one character every 800 ns.

Each signal from the PC bus is buffered prior to usage on the card to provide the required one LSTTL (Low Power Schoitky Transistor, Transistor Logic) equivalent loading. Integrated Circuits (ICs) 6H, 6F and 6E buffer the address lines, the system clock and three of the control strobes (MEMR, MEMW, and IOW). IC 6J buffers the data bus.

IOR and AEN are directly connected to programmable logics arrays (PALs) 1 and 2, respectively, in device/select control 74, which corresponds to the address decode 62 in FIG. 5, without an additional buffering. All use of these signals are generated by the PALs.

IC 4J buffers RESET and generates both senses of the signal for use by various logic blocks. Every signal used by the system is an input, with the following exceptions: the bidirectional databus and the input/output (I/O) channel ready indication.

IC 6J buffers the eight bit data bus. It is always enabled, and normally driving system data onto the binary data (BD) bus. The PAL1 generated signal data direction (DDIR) controls when BD data is driven onto the system bus. This function is discussed with PAL1, but generally a read from the following devices will gate the BD data: video memory, initialization rom, enabled game port, system configuration switches, and V6355 data registers.

The I/O channel ready line is used to arbitrate access to the on-board video memory. This signal, when pulled low, causes the PC microprocessor to execute wait states until released (high). If the PC attempts to access video memory while the video controller is refreshing the screen, the control signals and data paths are blocked internal to the V6355 controller, and the processor is made to wait via IOCHRDY. The video controller finishes its operation, then allows the processor cycle through. OCHRDY is released when the video memory has had sufficient time to transfer the data. IC's 7B and 7C ensure that the system does not drive this line when in phantom mode (LSW3- high).

The system acts as a peripheral only; it does not request the bus controls or run Direct Memory Address (DMA) cycles of its own.

CONTROL SIGNAL GENERATION

PC interface 72 provides control signals that are modified in control signal generation 76 by ICs 1B, 1C, 1D, and 3H to accommodate the systems two operating modes, i.e. the phantom and real modes, and the timing requirements of LCD controller.

As noted, in the phantom mode, the system is transparent to the computer video software. The system does not drive the data bus when the PC is reading status or video information from the native controller, which may share the same I/O and memory address.

IC 1B inhibits memory read commands from reaching LCD controller V6355 when the system is in phantom mode (LSW3- high). IC 3H performs the same function for I/O read commands.

Flip flops 1C provide increased address set-up time for I/O operations to the controller. The controller requires an unusually long delay between address and control strobe. The I/O write function to the controller (XIOW0-) is a function of both I/O write and memory write. Since the system may act as a shadow device to the native video controller in the computer, an alternate way of accessing it must be provided. PAL2 in device/select control 74 generates a ROM chip select signal (ROMCS-) which is used to address the driver ROM (a read only device). IC IB generates an IOW strobe from ROMCS- and BMEMW- which is OR'ed in with the IOW strobe from the PC by ID. This signal is delayed one clock (CLK) by IC to become XIOW-. This allows the code within the driver ROM to program the LCD controller by doing memory writes to the ROM address, without any disturbance to the native controller.

In order to complete the mapping, IOSEL- (PAL1) is a function of either the I/O address assigned to the controller or ROMCS-. IOW access through ROMCS- cannot occur, since this address will always fall outside of the 64K I/O space of the PC.

The memory write strobe belongs to the phantom mode cycle buffering section 78. During normal operation, multiplexer 6B presents the buffered PC memory write strobe and the PAL1 generated MEMSEL- signal to the LCD controller. This allows normal PC writes to access the video RAM at the memory address selected at boot time. Timing requirements are not critical. Since the V6355 controller traps all memory accesses and synchronizes them, no set-up time is required from select to control strobe.

If in phantom mode (LSW3- high), phantom mode signal MWRITE- is gated to both MEMSEL- and MEMW- of the LCD controller (V6355). This allows the cycle buffering circuitry to perform memory writes to the video controller independent of processor timing. This is important, because in phantom mode, the system may not request additional processor time through IOCHRDY.

OPERATING MODES

The system can be operated in four primary, switch selectable modes. Some modes also have subfunctions: (1) color (IBM CGA compatible)—(a) on and (b) off; (2) monochrome (IBM monochrome adapter compatible); (3) real mode (the single, native controller in the system); and (4) phantom or shadow mode (secondary controller, acting as a write only device, echoing the primary controller)—(a) color and (b) monochrome. Independent of the mode, the onboard game port may be enabled or disabled.

Eight dip switch settings are provided on card 18 for setting options prior to applying power to the PC. These allow the user to place the system in the PC address space so as to ensure compatibility with other PC peripherals.

Switch block SW1 (IC 5J) is set to the desired mode while power to the system is off. Switches five through eight directly affect the on-board logic. Switches one through four are software readable and perform functions determined by the init ROM (Init ROM switches 80). A table is provided below:

| SWITCH # | NAME | FUNCTION |
|---|---|---|
| 1 | GAME | REMOTE CONTROL ENABLE |
| 2 | GREY | READ BY INIT ROM, PROGRAMS 6355 MODE |
| 3 | | RESERVED FOR FUTURE FIRMWARE OPTION |
| 4 | COL | SETS MEMORY AND I/O ADDRESS FOR CGA OR MONOCHROME CARD EMULATION |
| 5 | A14 | INIT ROM ADDRESS SELECT |
| 6 | A15 | INIT ROM ADDRESS SELECT |
| 7 | A16 | INIT ROM ADDRESS SELECT |
| 8 | A17 | INIT ROM ADDRESS SELECT |

REAL MODE

In the real mode, the system appears to the PC to be a real CGA or monochrome display adapter (MDA) card. This mode is controlled exclusively by the firmware. When the power is first applied to the system, the real mode is set to off by the action of the system RESET DRV from pin B2 of the interface connector. In this state, attempts to read and write to the CGA or MDA I/O or memory address space are ignored.

When the INIT firmware is called by the system BIOS in the normal course of system initialization, the firmware first resets LSW3 (a flip-flop contained within PAL 4) and then attempts to detect the existence of the appropriate video memory. If it finds the memory, the presumption is that there is already a display card present in the system, and the system is to be operated in the phantom mode and LSW3 is left OFF. If no video memory is detected, LSW3 is set to ON, and real mode is enabled.

LSW3- performs several enable functions. In general, the real mode allows all CPU commands, data, and address through to the LCD controller. LSW3- gates BMEMR- at IC 1B, allowing memory read commands to reach the controller. The same function is performed at IC 3H for I/O read commands. Multiplexer 6B gates its A outputs when LSW3- is low, allowing BMEMW- and MEMSEL- directly through to the LCD controller. This multiplexer also causes the phantom mode address latches to be transparent, by forcing the G enables of IC's 5E and 5F to be high. In real mode, they simply pass the CPU address straight through at the appropriate time.

LSW3- also gates the IOCHRDY line at IC 7B. When LSW3- is low, MEMRDY from the controller enables LS125 7C to drive IOCHRDY inactive on the PC bus. In the phantom mode, this line must be left tristate.

During real mode operation, data from the host CPU is transferred to and from the controller through IC 1F. The output enable function for this bidirectional bus receiver (LS245) requires either an IOW- command or LSW3- to be low. IC 2H performs the gating.

PHANTOM MODE CYCLE BUFFERING

In the phantom mode, the system is not the primary controller. PC operating system software and applications are not aware of its presence, because it does not drive any data or control lines on to the bus. It is programmed to the proper mode by the init ROM (Init ROM switches 80) which may read status back through the MAP address.

During video RAM access (LCD interface 70), writes to video memory are allowed, and some control functions can be disabled. All reads from the video RAM and status come from the native controller. A scroll operation, for example, consists of reading the screen memory from the native controller and then writing it to both the native controller and the system of the present invention simultaneously.

Most current IBM video cards use IOCHRDY to resolve conflicts in access to the video RAM. The controller detects a processor access during a screen update, and asserts IOCHRDY to force the processor to wait. When the controller has finished its access, the processor is then allowed through. The amount of time the processor must wait is dependent on the particular video operation occurring, and the speed of the controller.

In the phantom mode, the system does not drive IOCHRDY, for it may conflict with the native processor, causing unpredictable results.

To provide adequate time for the system to receive data, regardless of the speed of the native controller, processor cycles are latched at CPU speed in phantom mode cycle buffering 78. The requested cycle is driven as soon as possible, and terminated by MEMRDY output by the controller. Incoming cycles occurring when the controller is busy are latched and queued for later access.

When LSW3- is high (set at power on time), the phantom mode is established. IC 1B prevents memory read commands: IC 3H prevents I/O read commands to the controller.

Multiplexer 6B gates its B inputs, allowing the PAL3 generated MWRITE- signal to become both MEMW- and MEMSEL- to the controller. No hold time is required. MEMWA, the address latch control, is allowed through to IC 5F.

IC 7B tristates tristate bus buffer gate (LS125) 7C, allowing the native controller to use IOCHRDY. LSW3- also enables PAL3 and IC 3J, the write address counter for cycle buffering (the read address counter resides inside PAL3). PAL3 is the state machine that buffers and resynchronizes system memory writes.

When the processor writes to the video RAM, both BMEMW- and MEMSEL- will be low. During this time, MEMSELW- from PAL3 (a combination of BMEMW- and MEMSEL-) will enable video memory data into the 4×4 register file (LS670) registers at the write address (WA). The video memory address is also enabled into IC 5E and 5F (or IC 4E and 4F).

PAL3 samples BMEMW- and MEMSEL-. When a write to video memory is detected (both signals low), an access latch is set internally on the downedge of the dot clock (DCK). The next downedge latches a "hit" register. There are two hit registers, set by a combination of the access latch and the WA. Either hit register being set provides MWRITE- (WA prevents them from both being set at the same time).

The MWRITE- signal gates data from the LS670 registers (1E, 2E) on to the internal (CD) data bus of the controller. It also gates addresses from either IC 5E, 5F or 4E, 4F onto the internal address (AD) bus of the controller. Which data and address set is gated is determined by the read address (RA) generated by PAL3. The CPU may end its write cycle to the native controller at any time. The upedge of BMEMW- will latch the data into the LS670's and the address into the IC 5E and 5F. WA is incremented at this point, such that the next processor write to video memory will not overwrite the previous data, and the next address will be latched into IC 4E and 4F.

PAL3 continues to drive MWRITE- until the controller asserts its MEMRDY line. At this time, the controller no longer requires the current data, and the next cycle may start. MWRITE- going high increments the read address (RA), such that the next MWRITE- cycle will drive the last buffered data.

If the native controller is slower than the system, the MWRITE cycle will terminate prior to the processor cycle. If it is faster, MWRITE cycles will stack up and the system of the present invention will actually finish the last memory write after the processor has completed its last write.

CHARACTER MAPPING

Due to the limitations of LCD technology, certain CRT character fonts are difficult to duplicate. The only variance available to the LCD is contrast, and it is used for color emulation. Displaying an intensified character simply by varying its contrast may cause it to be indistinguishable from a "color" character. The system uses a separate double-wide font in the character ROM (character generator 68 in FIG. 5) to achieve an articulate bold character.

The way IBM video memory is partitioned, for example, it actually takes two bytes to represent every character on the screen. This data consists of a character byte (stored in IC 4B), and an attribute byte (stored in IC 5B). IC 4B and 5B are in interface 70. IC 4B is enabled under direct control of the LCD controller during screen operations, and gates its data onto the RD bus. IC 5B, the attribute RAM, is isolated from the RD bus by IC 4A. The attribute RAM is always enabled into IC 4A. IC 4A is enabled onto the RD bus by the controller.

IC 5A is a latch clocked by the controller character clock. The data to this latch is bit 3 of the attribute RAM, the bold control bit.

During a controller screen refresh, character data is read from IC 4B onto the RD bus. It is latched into IC 3A by character clock (CCL). The attribute for this character is also driven at this time, and the bold attribute is latched into IC 5A. The combination of IC 3A and 5A provide an address to the character ROM. In this way, the bold attribute shifts the character ROM address to the top 2K where a different font is stored.

LCD CONTROLLER

As discussed, the fundamental function of the LCD controller (in interface 70) is to take data from the video memory and cycle it out to LCD 16 in the proper format. The format of the data is dependent on the monitor being emulated, and the video mode currently active.

In alpha/numeric mode, the video RAM (in interface 70) data consists of code pairs, character code, then attribute code. The character code is the low or even byte, residing in IC 4B. The attribute code is the high or odd byte, residing in IC 5B. During every screen refresh, the controller must read and interpret the data corresponding to the active screen area.

When screen data is required, the controller drives address on the AD bus. Process address buffers 4E, 4F, 5E, and 5F are disabled by signal XA- being high. LSEL- is activated first, allowing IC 4B to drive its data to the RD bus. When sufficient RAM data access time has been established, CCL goes high latching the character data into IC 3A, an eight bit latch. IC 3A (along with IC 5A) provides the high address bits (A11-A3) to character ROM IC 1A in LCD interface 70. This address is actually a pointer to an eight byte block of data describing the character corresponding to the code. Each one of the bytes is a row of dot matrix character data. In the same time interval that the character code is latched to provide the block pointer, RA 2-0 is driven to ROM address bits A2-A0 to provide the (one of eight) row address.

After sufficient ROM access time has been allowed, LOAD- is applied to shift register 2B latching the row data from the character ROM. Successive dot clocks (DCK) shift each bit into the controller through gate data out (GDO).

In parallel with this row data access from the character ROM, the controller raises LSEL- and lowers HSEL-, initiating a read from IC 5B, the attribute RAM. This data enters the controller through the RD bus directly with no translation. IC 4A simply acts as isolation for attribute mapping.

The attribute byte is decoded to detect the various modes in which each byte may be represented. These modes vary between CGA and MDA emulation.

The high nibble of the attribute byte references the background, the low nibble references the character itself.

| BACKGROUND | | | | FOREGROUND (CHARACTER) | | | |
|---|---|---|---|---|---|---|---|
| BIT 7 | 6 | 5 | 4 | 3 | 2 | 1 | 0 |
| L | R | G | B | I | R | G | B |

Where
L = Blink
R = Red
G = Green
B = Blue
I = Intensified

A color is interpreted by ORing the set bits together. For example, a black intensified foreground would have bits three through zero set to "1". The system will attempt to map this 1 of 16 color choice to a 1 of 8 intensity choice, if switch 2 is ON. If color is disabled, only normal and intensified (bold) are processed. Bold is not processed as an intensity level in this mode. A second, double wide font is actually used.

In MDA mode, the attribute byte is interpreted differently. Bit 3 controls the intensity (bold font), and bit 7 the blinking of the character. Combined with these bits, there are then three special combinations of the other six bits that control underline, reverse video and video off as follows.

| BIT 7 | 6 | 5 | 4 | 3 | 2 | 1 | 0 | |
|---|---|---|---|---|---|---|---|---|
| L | 0 | 0 | 0 | B | 0 | 0 | 0 | VIDEO OFF |
| L | X | X | X | B | 0 | 0 | 1 | UNDERLINE |
| L | 1 | 1 | 1 | B | 0 | 0 | 0 | REVERSE VIDEO |

Where
L = Blink
B = Bold (Special Font)
X = Don't Care
Other combinations of bits 0, 1, 2, 4, 5 and 6 produce normal video.

The row data accepted through GDO is translated as necessary to accommodate the attribute, and cycled out LD7-LD0 at the proper time determined by shift clock (SCK), sync pulse (FLM), and latch pulse (LC) (See Table 2). These signals are LCD dependent and their timing is programmed by initializing the LCD controller to the proper mode.

The CGA graphics mode is much less complex. Data from both the character and attribute RAMs is considered to be bit-mapped information corresponding to particular positions on the LCD. Data is cycled out from each RAM alternately directly to the RD bus. Color is determined as above. The character ROM GDO data is not used.

REMOTE CONTROL

The system remote control interface 82 provides a way to modify video parameters independent of video memory. The video on/off switch connects to J2 pin 6. This conditioned signal is inverted twice at IC 6K (an HC14 Schmidt trigger inverter) in screen image control 84 to become the clock for IC 5K. This flip-flop is set at power on, and configured to toggle its output at every clock. The output is gated with the controller "M" (square wave) signal at IC 1D.

Therefore, at power on, "M" is enabled to IC 1J which buffers it through the cable to LCD 16 head unit. Video is enabled. Whenever the video on/off switch of the remote control is depressed, J2 pin 6 is pulled low, IC 5K toggles its output. The first instance after power up will disable "M" to the LCD.

The LCD head unit detects that "M" is not active, and powers down the LCD. The LCD is opaque blue without power applied. This also protects the LCD, as applying power without "M" active may damage it. Subsequent depressions of the switch will toggle between "M" active and "M" inhibited. This in no way affects the data stored in the screen memory, it simply inhibits the image from being displayed.

Also provided on the remote control is video reverse/normal. The remaining Schmidt trigger gates in IC 6K invert the signal. The second 5K flip-flop is clocked by this signal.

The outputs of this flip-flop are used to selectively enable either IC 3K or IC 4K in screen image control 84. These two chips buffer the controller LD data bus to the cable. IC 3K inverts the data, 4K does not.

At power on, IC 5K is set enabling IC 3K to drive inverted LD data to the LCD head unit. There it is inverted once more to produce normal video. When the video reverse/normal switch is depressed, J2 pin 8 is grounded, and 5K toggles. The inverting buffer is disabled, IC 4K is enabled to drive data to the LCD head unit. There it is inverted to become an inverse video representation of what is in the video RAM.

PALs

Card 18 also contains four programmable logic arrays (PALs) to minimize cost and board area while improving reliability by reducing parts count. These are:

| PAL | I.C.# | TYPE | FUNCTION |
|---|---|---|---|
| 1 | 5H | 20L8A | ADDRESS DECODE FOR DEVICE SELECT/BUS INTERFACE |
| 2 | 3E | 20L8A | ADDRESS DECODE FOR DEVICE SELECT |
| 3 | 4H | 16R6 | PHANTOM MODE CONTROL STATE MACHINE AND DECODES |
| 4 | 1H | 16R4 | FEATURE CONTROL LATCHES AND CURSOR SIZE REGISTER INTERLOCK |

PAL1 (in device select/control 74) provides device selects and data steering signals. It decodes the host processor address and control lines, and the switch lines that control ROM address. It also uses some partial chip selects generated by PAL2. The signal DDIR controls which direction IC 6J drives data between the computer data (D) and binary data (BD) busses. This LS245 is always enabled. During non-system access, DDIR is normally high, driving D data onto the BD bus. IC 1F and 3F are the only two active devices on the BD bus, and their control enables act in conjunction with DDIR.

BD data is gated to the D bus when one of the following conditions is true: (1) host processor (or DMA) memory read from system video memory and LSW3- low (real mode); (2) host processor (or DMA) memory read from ROM address set by switches 5, 6, 7, 8; (3) host processor I/O read from enabled game port; and (4) host processor I/O read from MAP address and LSW3- Low (real mode). (MAP address is described with PAL2 where it is generated).

Switch 4 designates whether the system will emulate a monochrome (MDA) or color (CGA) monitor. The signal MEMSEL- is generated at address B000:0 for switch 4 off, monochrome mode. If switch 4 is on, then MEMSEL- begins at B800:0. In either case, MEMSEL- is active for a 16K byte range.

The ROM1 and ROM2 outputs of PAL1 are partial address decodes of BA19-BA16 and switches 8-5. This logic one is compared to BA17 in PAL1. If BA17 is high, ROM1 will be low, inhibiting the chip select. If BA17 is low, ROM1 will be high, and chip select will depend on ROM2.

In this manner, open switches request a low on the corresponding address line, closed switches a high. When BA17 and BA16 match the requested setting of switches 8 and 7 respectively, ROM1 is high. ROM2 is high when BA15 and BA14 match the requested setting of switches 6 and 5 respectively. These outputs will be used by PAL 2 to generate the ROM and MAP selects. A table is provided in the PAL2 discussion to show the available addresses.

IOSEL-, the I/O chip select for the LCD controller, is derived from three PAL's. PAL4 (in init ROM switches 80) generates IOPCOND, the conditioned select for controller I/O access, based on an address function from PAL2 (IOP) and the cursor size register interlock circuit. In PAL1, IOPCOND is OR'd with the MAP address to produce IOSEL-. This provides an alternate access path to the controller registers during phantom operation when I/O access is inhibited. The select will be generated for both the proper I/O address (set by switch 4), and the MAP address. BIOR- is simply a buffered version of the PC bus IOR-signal.

PAL2 (also in device select/control 74) works in conjunction with PAL1 to provide the remainder of the device selects. PALs 1 and 2 are more easily understood by viewing them as one part.

IOP- is the basic address select for the LCD controller registers. It is inhibited on DMA access. Switch 4 selects between the monochrome (3B0-3BF) and CGA (3D0-3DF) I/O range. PAL4 further conditions this signal with the cursor interlock function and outputs IOPCOND- to PAL1.

GAMESEL- is low when an I/O read is performed from an enabled game port (switch 1 on), or a memory read is performed from the MAPPED area. This line enables IC 2J onto the BD bus allowing the host processor to read the remote control switches from the IBM compatible game port address.

A multiplexing function is set up on SW1. Game port reads provide the remote control data on BD5 and BD4 with BD3-BD0 pulled up. This is required for software that attempts to detect the presence of a game port. If reading from the MAP address, BD3-BD0 will be driven with the proper sense of game port signals GSW3-GSW0.

The system controller card occupies 16K bytes of the IBM PC ROM area, selectable in 16 ranges. This 16K byte region is split between MAP- and ROMCS-. The init ROM code resides in an 8K byte 2764 beginning at the start address of the range. The MAPPED area begins 8K later (BA13 selects between ROMCS- area and MAP- area). Both the ROM and the MAP area are inhibited on DMA access.

The address range for each switch combination is shown below. A "0" denotes a switch is ON, and a "1" denotes a switch is OFF. (Switch ON grounds the line to logic 0, switch OFF allows it to be pulled up to logic 1).

| SWITCH 8 7 6 5 | ROMCS- | MAP- |
|---|---|---|
| 0 0 0 0 | C000:0-C1FF:F | C200:0-C3FF:F |
| 0 0 0 1 | C400:0-C5FF:F | C600:0-C7FF:F |
| 0 0 1 0 | C800:0-C9FF:F | CA00:0-CBFF:F |
| 0 0 1 1 | CC00:0-CDFF:F | CE00:0-CFFF:F |
| 0 1 0 0 | D000:0-D1FF:F | D200:0-D3FF:F |
| 0 1 0 1 | D400:0-D5FF:F | D600:0-D7FF:F |
| 0 1 1 0 | D800:0-D9FF:F | DA00:0-DBFF:F |
| 0 1 1 1 | DC00:0-DDFF:F | DE00:0-DFFF:F |
| 1 0 0 0 | E000:0-E1FF:F | E200:0-E3FF:F |
| 1 0 0 1 | E400:0-E5FF:F | E600:0-E7FF:F |
| 1 0 1 0 | E800:0-E9FF:F | EA00:0-EBFF:F |
| 1 0 1 1 | EC00:0-EDFF:F | EE00:0-EFFF:F |
| 1 1 0 0 | F000:0-F1FF:F | F200:0-F3FF:F |
| 1 1 0 1 | F400:0-F5FF:F | F600:0-F7FF:F |
| 1 1 1 0 | F800:0-F9FF:F | FA00:0-FBFF:F |
| 1 1 1 1 | FC00:0-FDFF:F | FE00:0-FFFF:F |

TABLE OF ADDRESS ACCESS

| | ROM ADDRESS | MAP ADDRESS |
|---|---|---|
| MEMR- | ROM CODE | 1,1,REV,FWD,GSW4-GSW1 |
| MEMW- | I/O WRITE TO 6355 CONTROLLER | WRITE TO CONTROL LATCHES |

PAL3 (in phantom mode cycle buffering 78) generates the phantom cycle control signals. Five of the output pins are internal nodes and do not connect anywhere else on the board. MWRITE-, MEMSELW-, and RA- direct address and data flow for the transfer.

MWRITE- is the memory write signal for the phantom cycle. It is activated when the system has received a phantom mode video memory write access, and the LCD controller is not currently processing the previous memory write. The active low edge is synchronized to DCK, but the end of cycle upedge is asynchronous (occurring with MEMRDY). Its function is to enable latched processor data from IC's 1E and 2E onto the CD bus, while presenting an VMEMW-to the controller.

Latches 4E, 4F, 5E, and 5F are provided for buffering addresses during phantom mode. RA and WA are flip flops such that each progressive memory write is stored in an alternate location, and each phantom cycle is gated from the last used location.

In the real mode, the address buffers are used in transparent mode, it is not necessary to latch the cycle.

RA, the phantom mode read address, controls which pair of latches gates its data onto the AD bus. Real mode (LSW3- low) fixes RA high such that IC's 5E and 5F are always used. IC 6B will force SIG2 high, setting both 5E and RF in transparent mode. XA- from controller 60 now controls the data flow.

In the phantom mode, RA is allowed to count and is incremented at the termination of each phantom cycle, when MWRITE- goes high.

MEMSELW- is low during a processor memory write to the video RAM. It is used to latch the address into IC's 4E and 4F, or alternately IC's 5E and 5F, depending on the state of WA. This address is later gated to the controller during the phantom cycle. The upedge of MEMSELW- is used to increment the phantom write address (WA), such that the next write address will be stored in the alternate latches.

PAL4 (in init ROM switches 80) is essentially a four bit control latch. Host processor memory writes to the MAP address allow access to control bits LSW1-LSW4. IOPCOND- is also provided as a condition for PAL1's IOSEL- signal. This line will inhibit IOSEL- if the interlock circuitry is enabled and detects a cursor function, or if LSW4 is not set.

External to PAL4, IC's 1B and 3J provide the signal PALRESET. During power up, this bit is set, disabling the active low LSW1- and ISW3- outputs of PAL4. It is also used to reset the phantom mode write circuit in PAL3. The control bits have the following function, dependent on the state of PALRESET:

LSW1: Enables IBM compatible GAME PORT at I/O address 201H. This bit is set during initialization whenever a gameport is not detected in the rest of the system, or when SW1 is set.

LSW2: This bit is undefined at power on. It controls the cursor interlock circuitry of PAL 4. When set high, attempts to write to cursor registers 10 or 11 of the LCD controller will be inhibited. This is achieved by detecting that the most recent write to address 4 (3B4 for MDA or 3D4 for CGA) had the 5 lower bits of the data bus set to OAH or OBH.

This bit is set by the initialization software when MDA mode is selected by SW4. It prevents the cursor from disappearing when a program attempts to set the cursor to a line number greater than 8. (An MDA has 14 lines per character but the system is limited to 8 due to the structure of the LCD). Occasionally the setting of this bit may result in minor irregularities in the cursor when running in MDS emulation mode.

LSW3: Real mode control bit. When active (LSW3- low), the system is considered to be the only display adapter in the system. In the high state (set at power on), direct access to the controller is inhibited and phantom mode is active.

This bit is set during initialization if the software fails to detect the video memory associated with a display adaptor of the selected type (MDA or CGA), in the rest of the system.

LSW4: Enables I/O write access to the controller at its selected address. LSW4 is set by the software during initialization.

ROM INITIALIZATION CODE

Control card 18 contains initialization code in an on board ROM. The ROM is a separate function located in init ROM switches 80. It is 8K bytes in length, starting from the address selected by SW8-SW5 (for available address ranges see the PAL2 functional description).

This ROM is configured as a "System accessible ROM module". The first two bytes are an identifier (HEX 55 followed by HEX AA in the ROM). The third byte is a length indication, the number of bytes divided by 512.

During the POST function of the BIOS, address C8000 through F4000 are scanned in 2K increments for the identifier bytes. If they are found, a checksum is formed on the number of bytes indicated by the length. If the checksum is zero, the BIOS assumes a valid ROM has been detected and does a FAR CALL to the fourth byte of the ROM.

This entry point does a NEAR CALL to the system initialization code. A FAR RETURN is executed at the end of the initialization which allows the BIOS to continue with the boot process.

Some early BIOS released by IBM and compatible system manufacturers do not scan for system accessible ROM modules and hence do not automatically install the system. For these machines it is necessary to either upgrade to a later version of the BIOS or to use a special program to initialize the system. Some BIOS versions give an error message if they do not initially detect a video adapter of the type determined by the system configuration option switches. In most of these systems the error condition is cleared once the system initialization code is called.

Since the system of the present invention may be in phantom mode after RESET, it can not be detected as a video adapter during the BIOS POST routines. The system code checks that the operating system has initialized the video I/O vector to some kind of video adapter. If a null vector is detected, or the vector exists but points to an interrupt return (IRET) instruction, interrupt location 10H is set to point to the BIOS video I/O routine at address F000:F065.

Next, the video parameters interrupt is checked, interrupt 1DH. If this is a null vector, it is reassigned to point to the video parameter tables stored in the system init ROM.

Interrupt vector 1FH is a pointer to the graphics character tables. If this pointer is null, or points to the standard IBM graphics tables in the BIOS ROM; then it is re-mapped to point to the font stored in the system ROM. This font is optimized for LCD display.

The effect of this code is to configure the operating system such that the system is the primary controller if no other exists at POST time. Also, an optimized LCD font is installed if no display adapter was found, or if the current display adapter uses the standard IBM fonts. If the fonts were re-mapped to exist somewhere else in memory space, the system must use them. At this point, the code begins to initialize the system itself.

The on board configuration switches are read. CGA or MDA mode is programmed depending on switch 4. A test is performed to determine if an IBM compatible game port is active. If no port responds, or the user has requested the system game port (via switch 1), then the on board game port is enabled.

Detection tests are performed for CGA and MDA monitors by doing a minimal initialization, then testing for active RAM in the B800:0 range for CGA and B000:0 range for MDA. If the mode requested by switch 4 matches an existing display adapter, then the system is left in phantom mode to act in parallel with the primary display. If no display adapter exists, or a different type exists, the system is changed to real mode.

Programs such as LOTUS 1-2-3 are capable of using two different displays at once, one for characters and one for graphs or charts. This algorithm allows the system of the present invention to act as a secondary display.

The remainder of the code initializes the Yamaha V6355 display modes. If MDA mode was selected (switch 4), then underlining is enabled. If CGA mode was selected, the gray scale enable is checked (switch 2). Attribute mapping to five intensity levels (gray shades) is programmed if requested. A 16K byte range is written to ASCII space characters with no attribute in CGA mode (only 4K is required if in MDA mode), clearing the display to all blank characters.

The final operation performed is a video initialization interrupt call which sets the video mode to 80 columns by 25 rows of characters.

Although certain specific embodiments of the invention have been described herein in detail, the invention is not to be limited only to such embodiments, but rather only by the appended claims.

What is claimed is;

1. A display apparatus comprising: a liquid crystal cell including (i) a liquid crystal material having a state of optical retardation variable only within a range between about 0.3 microns and 1.6 microns, (ii) a plurality of electrodes for applying an electric field across said liquid crystal material, (iii) a first polarizer at a viewing side of said cell (iv) a second polarizer on the side of said cell remote from said first polarizer, and (v) said liquid crystal material in said cell responsive to different magnitudes of the electric field for the display of perceived color differences;

said cell part of a panel positionable on a stage projector, said panel having first and second transparent surfaces to establish a light path therethrough and said cell located therebetween; and means for interfacing said cell with a computer and for converting color display information produced by said computer to drive signals and means for applying said drive signals to said electrodes wherein different levels of average rms voltage are applied across selected ones of said electrodes to display said perceived color differences.

2. The display apparatus of claim 1 wherein said cell includes a first alignment layer on said viewing side and an axis of polarization of said first polarizer forms an angle of between approximately 25° and 35° with respect to a rubbing direction on the first alignment layer.

3. The display apparatus of claim 2 wherein said cell includes a second alignment layer on the side of said liquid crystal material remote from said first alignment layer and an axis of polarization of said second polarizer forms an angle of between approximately −25° and −35° with respect to the rubbing direction on the second alignment layer.

4. The display apparatus of claim 1 wherein said liquid crystal material is a supertwisted nematic liquid crystal material that has twist angle of between about 180° and 270°.

5. The display apparatus of claim 1 wherein said liquid crystal material is a supertwisted nematic liquid crystal material that has a twist angle of about 240°.

6. A display apparatus comprising:

a liquid crystal cell including (i) a supertwisted nematic liquid crystal material having a state of optical retardation variable only within a range between about 0.3 micrometers and 1.6 micrometers, (ii) a plurality of electrodes for applying an electric field across said liquid crystal material, (iii) a first polarizer at a viewing side of said cell (iv) a second polarizer on the side of said cell remote from said first polarizer, and (v) said liquid crystal material in said cell responding to different magnitudes of the electric field for the display of various perceived colors the majority of which fall outside an envelope defined by the following coordinates connected by straight lines on a 1931 C.I.E. chromaticity diagram: $(x \approx 0.25, y \approx 0.17)$, $(x \approx 0.38, y \approx 0.30)$, $(x \approx 0.40, y \approx 0.38)$, $(x \approx 0.34, y \approx 0.43)$, $(x \approx 0.23, y \approx 0.35)$, and $(x \approx 0.19, y \approx 0.18)$;

said cell part of a panel positionable on a stage of an overhead projector, said panel having first and second transparent surfaces to establish a light path therethrough and said cell located therebetween; and means for interfacing said cell with a computer and for converting color display information produced by said computer to drive signals and means for applying said drive signals to said plurality of electrodes wherein different levels of average rms voltage are applied across selected ones of said electrodes to display said perceived color differences.

7. The display apparatus of claim 6 wherein said projector includes means for transmitting a light beam through said cell for forming an enlarged image of the display produced thereby.

8. The display apparatus of claim 6 wherein said electrodes comprise a 640×200 dot matrix arrangement.

9. A display apparatus comprising:

a liquid crystal cell including (i) a supertwisted liquid crystal material having a state of optical retardation variable within a range between about 0.3 micrometers and 1.6 micrometers for the display of at least four perceived color differences, (ii) an array of pixels arranged vertically in columns and horizontally in rows for applying an electric field across said liquid crystal material, (iii) a first polarizer at a viewing side of said cell, (iv) a second polarizer on the side of said cell remote from said first polarizer, and (v) said liquid crystal material in said cell responsive to different magnitudes of the electric field for the display of said perceived color differences;

means for converting color display information produced by a computer and for applying time multiplexed signals to said pixels wherein different levels of average rms voltage are applied across said liquid crystal material by varying an on period relative to a frame period in order to display said perceived color differences; and said cell part of a panel for use with a projector including means for transmitting a light beam through said cell for forming an enlarged image of a display produced by said cell.

10. The display apparatus of claim 9 wherein said panel has first and second transparent surfaces to establish a light path for the light beam.

11. The display apparatus of claim 10 wherein said array of pixels comprises two 640×100 dot matrix arrangements.

12. The display apparatus of claim 11 operated in a blue mode and wherein each of said dot matrix arrangements are driven at a 1/100 duty cycle, and said liquid crystal material responsive to said different magnitudes of the electric field to produce a curve on a 1931 C.I.E. chromaticity diagram including points have the following coordinates: $(x \approx 0.195, y \approx 0.130)$, $(x \approx 0.260, y \approx 0.140)$, $(x \approx 0.425, y \approx 0.340)$, $(x \approx 0.445, y \approx 0.410)$, $(x \approx 0.415, y \approx 0.430)$.

13. A display apparatus comprising:

a liquid crystal cell including (i) a supertwisted nematic liquid crystal material having a state of optical retardation variable only within a range between about 0.3 microns and 1.6 microns, (ii) an array of pixels arranged vertically in columns and horizontally in rows for applying an electric field across said liquid crystal material, (iii) a first polarizer at a viewing side of said cell, and (iv) a second polarizer on the side of said cell remote from said first polarizer, and (v) said liquid crystal material in said cell responsive to different magnitudes of the electric field for the display of perceived color differences;

means for converting color display information produced by a computer to a plurality of time multiplexed signals; and means for applying said time multiplexed signals to said array of pixels wherein different levels of average rms voltage are applied across selected ones of said pixels by varying an on period relative to a frame period in order to display said perceived color differences.

14. The display apparatus of claim 13 wherein said cell is part of a panel for use with a projector including means for transmitting a light beam through said cell for forming an enlarged image of the display produced by said cell.

15. The display apparatus of claim 14 wherein said panel may be positioned on a stage of an overhead projector, and said panel has first and second transparent surfaces to establish a light path for the light beam.

16. The display apparatus of claim 13 wherein said means for applying said time multiplexed signal produces at least five levels of average rms voltage.

17. The display apparatus of claim 16 wherein said liquid crystal material is responsive to the different levels of average rms voltage to produce a curve on a 1931 C.I.E. chromaticity diagram including points having the following coordinates: (x≈0.195, y≈0.130), (x≈0.260, y≈0.140), (x≈0.415, y≈0.340) (x≈0.445, y≈0.410), (x≈0.415, y≈0.430).

18. The display apparatus of claim 13 wherein the vibration direction of light polarized by said first polarizer is non-parallel to the optic axis of said liquid crystal material at its front boundry layer and the vibration direction of light polarized by said second polarizer forms an angle with respect to the vibration direction of light polarized by said first polarizer.

19. The display apparatus of claim 13 operated in the blue mode.

20. The display apparatus of claim 13 operated in the yellow mode.

21. The display apparatus of claim 13 wherein there are at least four perceived color differences.

22. A display apparatus comprising:
a liquid crystal cell including
(i) a birefringent liquid crystal material having a state of optical retardation variable only within a range between about 0.3 μm and 1.6 μm.
(ii) an array of pixels arranged vertically in columns and horizontally in rows for applying an electric field across said liquid crystal material, (iii) a first polarizer means at a viewing side of said cell, and (iv) a second polarizer means on the side of said cell remote from said first polarizer means, and (v) said liquid crystal material in said cell responsive to different magnitudes of the electric field for the display of perceived color differences;

means for converting color display information produced by a computer to a plurality of signals; and means for applying said signals to said array of pixels wherein different levels of average rms voltage are applied across selected ones of said pixels in order to display said perceived color differences.

23. The display apparatus of claim 22 wherein said cell is part of a panel for use with a projector including means for transmitting a light beam through said cell for forming an enlarged image of the display produced by said cell.

24. The display apparatus of claims 13 or 22 wherein said liquid crystal material is responsive to said different levels of average rms voltage to produce various perceived colors the majority of which fall outside an envelope defined by the following coordinates connected by straight lines on a 1931 C.I.E. chromaticity diagram: (x≈0.25, y≈0.17), (x≈0.38, y≈0.30), (x≈0.40, y≈0.38), (x≈0.34, y≈0.43), (x≈0.23, y≈0.35), and (x≈0.19, y≈0.18).

25. A display apparatus comprising:
a liquid crystal cell including
(i) a liquid crystal material having a state of optical retardation variable within a range between about 0.3 microns and 1.6 microns for the display of at least four perceived color differences,
(ii) a plurality of electrodes for applying an electric field across said liquid crystal material,
(iii) a first polarizer means at a viewing side of said cell,
(iv) a second polarizer means on the side of said cell remote from said first polarizer means, and
(v) said liquid crystal material in said cell responsive to different magnitudes of the electric field of the display of said pereeived color differences;

said cell part of a panel positionable on a stage of a projector, said panel having first and second transparent surfaces to establish a light path therethrough and said cell located therebetween; and means for interfacing said cell with a computer and for converting color display information produced by said computer to drive signals and means for applying said drive signals to said electrodes wherein different levels of average rms voltage are applied across selected ones of said electrodes to display said perceived color differences.

* * * * *